(12) United States Patent
Mi et al.

(10) Patent No.: US 12,192,189 B2
(45) Date of Patent: *Jan. 7, 2025

(54) SMART GATEWAY ENABLED LOW COST SMART BUILDING SOLUTION

(71) Applicant: INTERDIGITAL CE PATENT HOLDINGS, SAS, Paris (FR)

(72) Inventors: Feng Mi, Beijing (CN); Wei Luo, Beijing (CN); Gao Zhang, Beijing (CN)

(73) Assignee: INTERDIGITAL CE PATENT HOLDINGS, SAS, Paris (FR)

( * ) Notice: Subject to any disclaimer, the term of this patent is extended or adjusted under 35 U.S.C. 154(b) by 0 days.

This patent is subject to a terminal disclaimer.

(21) Appl. No.: 18/434,405

(22) Filed: Feb. 6, 2024

(65) Prior Publication Data
US 2024/0214367 A1 Jun. 27, 2024

Related U.S. Application Data

(63) Continuation of application No. 17/833,507, filed on Jun. 6, 2022, now Pat. No. 11,930,004, which is a
(Continued)

(51) Int. Cl.
*H04L 9/40* (2022.01)
*H04L 12/06* (2006.01)
(Continued)

(52) U.S. Cl.
CPC .......... *H04L 63/0815* (2013.01); *H04L 12/06* (2013.01); *H04L 12/66* (2013.01);
(Continued)

(58) Field of Classification Search
None
See application file for complete search history.

(56) References Cited

U.S. PATENT DOCUMENTS 9,456,297 B2 9/2016 Pi-Sunyer
9,584,520 B2 2/2017 Logue et al.
(Continued)

FOREIGN PATENT DOCUMENTS

CN 102195997 A 9/2011
CN 103399548 11/2013
(Continued)

OTHER PUBLICATIONS

Azni et al., "Home automation system with android application," 3rd International Conference on Electronic Design (ICED) (Aug. 2016).
(Continued)

*Primary Examiner* — Lashonda Jacobs-Burton
(74) *Attorney, Agent, or Firm* — VOLPE KOENIG

(57) ABSTRACT

A method and apparatus are described including logging on to an account on the shared server based on credentials, transmitting a request to the shared server for a list of smart devices registered to the account, receiving the list of smart devices from the shared server, linking to a selected one of the smart devices from the list of smart devices received from the shared server; and transmitting a smart device command to the selected smart device. Also described are a method and apparatus including receiving credentials from a client device to log-on to an account, receiving a request from the client device for a list of smart devices registered to the account and transmitting the list of smart devices to the client device.

12 Claims, 18 Drawing Sheets

Related U.S. Application Data continuation of application No. 16/651,727, filed as application No. PCT/CN2017/104258 on Sep. 29, 2017, now Pat. No. 11,374,918.

(51) Int. Cl.
*H04L 12/66* (2006.01)
*H04L 67/01* (2022.01)
*H04L 67/02* (2022.01)
*H04L 67/12* (2022.01)

(52) U.S. Cl.
CPC .......... *H04L 63/0853* (2013.01); *H04L 67/01* (2022.05); *H04L 67/02* (2013.01); *H04L 67/12* (2013.01)

(56) References Cited

U.S. PATENT DOCUMENTS

| | | | |
|---|---|---|---|
| 9,977,547 B1* | 5/2018 | Sloo | G06K 19/08 |
| 9,998,803 B2 | 6/2018 | Fadell et al. | |
| 10,114,351 B2 | 10/2018 | Fadell et al. | |
| 10,168,676 B2 | 1/2019 | Patel et al. | |
| 10,324,707 B2 | 6/2019 | Su et al. | |
| 10,834,586 B2* | 11/2020 | Christopher | H04W 12/06 |
| 10,848,338 B2* | 11/2020 | Farrahi Moghaddam | H04L 47/70 |
| 2003/0208554 A1* | 11/2003 | Holder | H04L 67/12 709/217 |
| 2004/0103144 A1 | 5/2004 | Sallam et al. | |
| 2005/0286417 A1 | 12/2005 | An et al. | |
| 2010/0107225 A1 | 4/2010 | Spencer et al. | |
| 2011/0202632 A1* | 8/2011 | Martin | G06F 16/9566 709/219 |
| 2011/0282931 A1* | 11/2011 | Chen | H04L 61/4557 709/245 |
| 2013/0261821 A1* | 10/2013 | Lu | H04L 12/2836 700/289 |
| 2014/0089671 A1* | 3/2014 | Logue | H04L 63/0807 713/182 |
| 2015/0052061 A1* | 2/2015 | Anderson | G06Q 20/409 705/44 |
| 2015/0227118 A1 | 8/2015 | Wong | |
| 2015/0281122 A1* | 10/2015 | Hoffman | H04L 61/103 709/203 |
| 2016/0087933 A1 | 3/2016 | Johnson et al. | |
| 2016/0142906 A1 | 5/2016 | Park et al. | |
| 2016/0173450 A1 | 6/2016 | Mircescu et al. | |
| 2016/0323457 A1* | 11/2016 | Isomäki | H04M 11/007 |
| 2017/0054594 A1 | 2/2017 | Decenzo et al. | |
| 2017/0063968 A1 | 3/2017 | Kitchen et al. | |
| 2017/0295167 A1 | 10/2017 | Robinson et al. | |
| 2017/0299210 A1* | 10/2017 | Nyamjav | F24F 11/46 |
| 2017/0344357 A1 | 11/2017 | Su et al. | |
| 2017/0353859 A1* | 12/2017 | Idnani | H04W 12/08 |
| 2018/0034655 A1* | 2/2018 | Christopher | G06F 3/048 |
| 2018/0165439 A1 | 6/2018 | Corcoran | |
| 2018/0220476 A1 | 8/2018 | Jung et al. | |
| 2019/0089787 A1 | 3/2019 | Yi et al. | |
| 2019/0116087 A1* | 4/2019 | Hiller | H04W 4/70 |
| 2019/0319960 A1* | 10/2019 | Shen | H04L 12/2816 |
| 2019/0342112 A1* | 11/2019 | Li | H04L 12/281 |
| 2019/0379655 A1* | 12/2019 | Todoroki | H04L 9/0819 |
| 2019/0387566 A1* | 12/2019 | Huang | H04W 74/0833 |
| 2020/0059976 A1 | 2/2020 | Bhatia et al. | |
| 2020/0259816 A1 | 8/2020 | Mi et al. | |
| 2021/0144025 A1 | 5/2021 | Choi et al. | |
| 2021/0165379 A1* | 6/2021 | Yang | G05B 19/042 |

FOREIGN PATENT DOCUMENTS

| | | |
|---|---|---|
| CN | 102195997 B | 8/2015 |
| CN | 105391719 | 3/2016 |
| CN | 105847067 | 8/2016 |
| WO | 2014/047384 | 3/2014 |
| WO | 2016/093721 | 6/2016 |

OTHER PUBLICATIONS

Cheah et al., "On Findability Issues of Constrained Web of Things in a Smart Home Environment," International Conference on Platform Technology and Service (PlatCon) (Feb. 2017).

Techtarget, "Home automation", What is home automation?—Definition from WhatIs.com (May 2, 2017).

Wikipedia, "Home automation", Apr. 23, 2017, https://en.wikipedia.org/wiki/Home_automation.

Wu et al., "An Implementation of Access-Control Protocol for IoT Home Scenario", 16th International Conference on Computer and Information Science (ICIS) (May 24-26, 2017).

* cited by examiner

SMART GATEWAY ENABLED LOW COST SMART BUILDING SOLUTION

CROSS-REFERENCE TO RELATED APPLICATIONS

This application is a continuation of U.S. application Ser. No. 17/833,507 filed Jun. 6, 2022, which issued as U.S. Pat. No. 11,930,004 on Mar. 12, 2024, which is a continuation of U.S. application Ser. No. 16/651,727 filed Mar. 27, 2020, which issued as U.S. Pat. No. 11,374,918 on Jun. 28, 2022, which is a National Stage of PCT/CN2017/104258, filed Sep. 29, 2017, the contents of all applications are incorporated herein by reference.

TECHNICAL FIELD

The proposed method and apparatus are directed to building automation including registration and control of smart devices using a smart gateway in an environment, such as a home (residence) or small business.

BACKGROUND

In multicast and broadcast applications, data are transmitted from a server to multiple receivers over wired and/or wireless networks. A multicast system as used herein is a system in which a server transmits the same data to multiple receivers simultaneously, where the receivers form a subset of all the receivers up to and including all of the receivers. A broadcast system is a system in which a server transmits the same data to all of the receivers simultaneously. That is, a multicast system, by definition, can include a broadcast system. In unicast applications, a transmitter (sender) transmits (sends, forwards) data to a single receiver.

This Section is intended to introduce the reader to various aspects of art, which may be related to the present embodiments that are described below. This discussion is believed to be helpful in providing the reader with background information to facilitate a better understanding of the various aspects of the present disclosure. Accordingly, it should be understood, that these statements are to be read in this light.

Building automation is the automation of a home (residence) or small business environment. When directed to a home or house, the home is called a smart home or smart house. Building automation includes the monitoring and the control and automation of lighting, heating (such as smart thermostats), ventilation, air conditioning (HVAC), and security including doors (including garage doors) as well as leak detection and warnings, freeze detection and warnings, glass breakage detection and warnings, fire and smoke detection and warnings, carbon monoxide detection and warnings, as well as home appliances such as washer/dryers, televisions, set top boxes, router, bridges, brouters, computers, laptop computers, tablets (tablet computers), microwave ovens, dishwashers, ovens or refrigerators/freezers. It is also possible to sense the occupancy of the environment using smart meters and smart environmental sensors like $CO_2$ sensors, which can be integrated into the building automation system to trigger automatic responses for energy efficiency and building comfort applications. These same building occupancy sensors can be used to advise emergency responders in advance of significant events, such as severe weather events, such that occupants can be evacuated ahead of the event, such as the recent hurricanes that have severely impacted the United States. This is especially true if the occupants are disabled. Indeed, building automation for the elderly or disabled may include additional and more advanced and complex automation. Modern automation systems may also include pet care including monitoring pet movement and access control.

Modern automation systems generally include switches and sensors connected to a central hub sometimes called a "gateway" from which the automation system is controlled with a user interface that interacts either with a wall-mounted terminal, mobile phone software, tablet computer or a web interface, and often but not always via Internet cloud services.

Wi-Fi is often used for remote monitoring and control. Smart devices in the environment (home, residence, small business), when remotely monitored and controlled via the Internet, are an important component of the Internet of Things. While there are many competing vendors, there are very few worldwide accepted industry standards and the smart home space is heavily fragmented. Popular communications protocol for products include X10, Ethernet, RS-485, 6LoWPAN, Bluetooth LE (BLE), ZigBee and Z-Wave, or other proprietary protocols all of which are incompatible with each other. Manufacturers often prevent independent implementations by withholding documentation and by litigation.

Historically systems have been sold as complete systems where the consumer relies on one vendor for the entire system including the hardware, the communications protocol, the central hub, and the user interface. There are a wide variety of technology platforms, or protocols, on which a smart home can be built. Each one is, essentially, its own language. Each language speaks to the various connected devices and instructs them to perform a function. The automation protocol transport has involved direct wire connectivity, powerline (UPB) and wireless hybrid and wireless. Most of the protocols below are not open. All or almost all have an application programming interface (API).

FIG. 1 is a schematic diagram of a conventional building automation system. The conventional building automation system of FIG. 1 a remotely accessible smart device (1), a monitoring server (2) and controlling application (APP) (3). The APP is accessible using a client device such as a smart phone, a personal digital assistant (PDA), a computer including a laptop computer, a notebook computer, a tablet or any other equivalent device.

When the APP monitors and controls smart devices, since the server and these smart devices are programmed and controlled using a proprietary protocol, the messages format and interfaces are well-defined, the gateway will forward the messages bi-directionally transparently, and the APP communicates with the server to update device status, and control the smart devices to work as expected. That means the server usually is specific for corresponding smart devices. In such conventional automation systems, the end-user needs to install a number of APPs, one for air conditioning, one for lighting, and so on.

According to such a conventional automation system, in order for a smart device manufacturer to develop such a smart automation system, the smart device manufacturer must:

1. Develop the smart device
2. Maintain a monitoring server—it is assumed that the smart device manufacturer already has a server for other previously developed smart devices
3. Develop an App for monitoring and controlling the smart device It may require significant cost and effort for a conventional device manufacturer (such as an air conditioning manufacturer) to develop new smart devices. Additionally, it may require significant cost and effort to maintain such a server. Typically, device and appliance manufacturers do not specialize in computers and programming. Device manufacturers, for example, refrigerator manufacturers know all about refrigerators and/or freezers but do not specialize in computers and programming. The air conditioning manufacturer may also have to consider security and legal consequences of accidental access by non-users or users that are not owners of the air conditioning equipment including access to personal or private information. The air conditioning manufacturer is or may not be an expert in computer security and the risks and legal consequences associated with a potential breach in computer security may be unacceptable to the air conditioning manufacturer.

An easy way is needed to help conventional device manufacturers to make their devices be accessible from the Internet, via an APP.

An objective of the proposed method and apparatus is to provide a low cost and secure smart automation solution, in which the smart device manufacturers do not need to focus on complex computer and networking technology. It would be helpful for the smart device manufacturers to provide web based devices. Such a solution can be accessible from Internet via a shared APP. Also, all existing web based devices can be accessed for monitoring and control via the shared APP provided by the proposed method and apparatus.

For example, the air conditioning manufacturer just needs to enable the air conditioning device or appliance to be able to connect to the gateway, which has a controlling web page. The proposed method and apparatus will help such a device or appliance to be accessible from Internet via a shared APP. The air conditioning manufacturer does not need to setup (create) and maintain a server to monitor and control the device or appliance. The air conditioning manufacturer does not need to develop any specific APP.

SUMMARY

The gateway is an important component in the proposed method and apparatus. The gateway monitors the LAN-side smart devices, and locates the smart devices, which can provide hypertext transfer protocol (HTTP) interface to end user. The gateway can manage the located smart devices, and interact with the server and APP. The gateway provides a URL for each located smart device, and works like an HTTP proxy to enable accessing the located smart devices from the Internet, via a shared APP installed in a client device. The end user opens the HTTP web page of the located smart devices from the Internet, to operate the located smart devices. The gateway provides a secure connection (HTTPS) for the Internet, and user authentication, to protect private information from network attack or information leak.

Since elements of embodiments can be implemented in software, the present invention can be embodied as computer readable code for provision to a programmable apparatus on any suitable carrier medium. A tangible carrier medium may comprise a storage medium such as a floppy disk, a CD-ROM, a hard disk drive, a magnetic tape device or a solid state memory device and the like. A transient carrier medium may include a signal such as an electrical signal, an electronic signal, an optical signal, an acoustic signal, a magnetic signal or an electromagnetic signal, e.g. a microwave or RF signal.

In a first aspect, a method is described including logging on to an account on the shared server based on credentials, transmitting a request to the shared server for a list of smart devices registered to the account, receiving the list of smart devices from the shared server, linking to a selected one of the smart devices from the list of smart devices received from the shared server and transmitting a smart device command to the selected smart device.

In an embodiment, the method further includes transmitting a request to a gateway with the credentials for user authentication and receiving the user authentication from the gateway.

In an embodiment, the method further includes receiving a response from the gateway redirecting the client device to a uniform resource locator for the smart device.

In an embodiment, a response to the log-on is received through a local area network and the Internet or through the Internet.

In an embodiment, the list of smart devices is received through the local area network and the Internet or through the Internet.

In an embodiment, the smart device command is transmitted though the uniform resource locator or to the gateway.

In another aspect, a method is described including establishing a connection with a shared server to register a smart device, receiving a request from a client device with credentials for user authentication and transmitting a response for the user authentication to the client device.

In an embodiment, the method further includes establishing a connection to link to a uniform resource locator for a smart device, receiving a command for the smart device from the client device, forwarding the command to the smart device, receiving a response to the command for the smart device from the smart device and transmitting the response to the command for the smart device to the client device.

In an embodiment, the response for the user authentication redirects the client device to a uniform resource locator for the client device.

In an embodiment, the method further includes receiving a dynamic host configuration protocol request for an Internet protocol address from a smart device including information about the smart device, providing the smart device with the Internet protocol address, determining if the smart device is a computer or user interface device, requesting a uniform resource locator, the uniform resource locator including a local area network side Internet protocol address of the smart device responsive to the determination, receiving a hypertext transfer protocol page for the uniform resource locator including the local area network side Internet protocol address of the smart device and establishing a connection with a shared server to register the smart device.

In an embodiment, the method further includes receiving a dynamic host configuration protocol request for an Internet protocol address from a smart device including information about the smart device, providing the smart device with the Internet protocol address, determining if the smart device is a computer or user interface device, requesting a uniform resource locator, the uniform resource locator including a local area network side Internet protocol address of the smart device responsive to the determination and receiving a hypertext transfer protocol page for the uniform resource locator including the local area network side Internet protocol address of the smart device.

In another aspect, a method is described including transmitting a dynamic host configuration protocol request packet to a gateway including information related to a smart device, the dynamic host configuration protocol request packet is to request an Internet protocol address for the smart device, receiving a request for a uniform resource locator including a local area network side Internet protocol address of the smart device, receiving a hypertext transfer protocol command from a client device and transmitting a response to the hypertext transfer protocol command to the client device.

In an embodiment, the hypertext transfer protocol command is through a gateway.

In an embodiment, the response to the hypertext transfer protocol command is through the gateway.

In an embodiment, the method further includes transmitting a dynamic host configuration protocol request packet to a gateway including information related to a smart device, the dynamic host configuration protocol request packet is to request an Internet protocol address for the smart device, receiving a request for a uniform resource locator including a local area network side Internet protocol address of the smart device and transmitting a web page to the gateway.

In an embodiment, the method further includes transmitting a web page to the gateway.

In another aspect, a method is described including receiving credentials from a client device to log-on to an account, receiving a request from the client device for a list of smart devices registered to the account and transmitting the list of smart devices to the client device.

In an embodiment, the response to the log-on is transmitted through a gateway or through the Internet.

In an embodiment, the list of smart devices is transmitted through the gateway or through the Internet.

In another aspect, an apparatus is described including means for logging on to an account on the shared server based on credentials, means for transmitting a request to the shared server for a list of smart devices registered to the account, means for receiving the list of smart devices from the shared server, means for linking to a selected one of the smart devices from the list of smart devices received from the shared server and means for transmitting a smart device command to the selected smart device.

In an embodiment, the apparatus further includes means for transmitting a request to a gateway with the credentials for user authentication, and means for receiving the user authentication from the gateway.

In an embodiment, the apparatus further includes means for receiving a response from the gateway redirecting the client device to a uniform resource locator for the smart device.

In an embodiment, a response to the log-on is received through a local area network and the Internet or through the Internet.

In an embodiment, the list of smart devices is received through the local area network and the Internet or through the Internet.

In an embodiment, the smart device command is transmitted though the uniform resource locator or to the gateway.

In another aspect, an apparatus is described including means for establishing a connection with a shared server to register a smart device, means for receiving a request from a client device with credentials for user authentication and means for transmitting a response for the user authentication to the client device.

In an embodiment, the apparatus further includes means for establishing a connection to link to a uniform resource locator for a smart device, means for receiving a command for the smart device from the client device, means for forwarding the command to the smart device, means for receiving a response to the command for the smart device from the smart device, and means for transmitting the response to the command for the smart device to the client device.

In an embodiment, the response for the user authentication redirects the client device to a uniform resource locator for the client device.

In an embodiment, the apparatus further includes means for receiving a dynamic host configuration protocol request for an Internet protocol address from a smart device including information about the smart device, means for providing the smart device with the Internet protocol address, means for determining if the smart device is a computer or user interface device, means for requesting a uniform resource locator, the uniform resource locator including a local area network side Internet protocol address of the smart device responsive to the determination, means for receiving a hypertext transfer protocol page for the uniform resource locator including the local area network side Internet protocol address of the smart device, and means for establishing a connection with a shared server to register the smart device.

In an embodiment, the apparatus further includes means for receiving a dynamic host configuration protocol request for an Internet protocol address from a smart device including information about the smart device, means for providing the smart device with the Internet protocol address, means for determining if the smart device is a computer or user interface device, means for requesting a uniform resource locator, the uniform resource locator including a local area network side Internet protocol address of the smart device responsive to the determination and means for receiving a hypertext transfer protocol page for the uniform resource locator including the local area network side Internet protocol address of the smart device.

In another aspect, an apparatus is described including means for transmitting a dynamic host configuration protocol request packet to a gateway including information related to a smart device, the dynamic host configuration protocol request packet is to request an Internet protocol address for the smart device, means for receiving a request for a uniform resource locator including a local area network side Internet protocol address of the smart device, means for receiving a hypertext transfer protocol command from a client device and means for transmitting a response to the hypertext transfer protocol command to the client device.

In an embodiment, the hypertext transfer protocol command is through a gateway.

In an embodiment, the response to the hypertext transfer protocol command is through the gateway.

In an embodiment, the apparatus further includes means for transmitting a web page to the gateway.

In another aspect, an apparatus is described including means for receiving credentials from a client device to log-on to an account, means for receiving a request from the client device for a list of smart devices registered to the account and means for transmitting the list of smart devices to the client device.

In an embodiment, the response to the log-on is transmitted through a gateway or through the Internet.

In an embodiment, the list of smart devices is transmitted through the gateway or through the Internet.

BRIEF DESCRIPTION OF THE DRAWINGS

The proposed method and apparatus is best understood from the following detailed description when read in conjunction with the accompanying drawings. The drawings include the following figures briefly described below.

Figure 1:
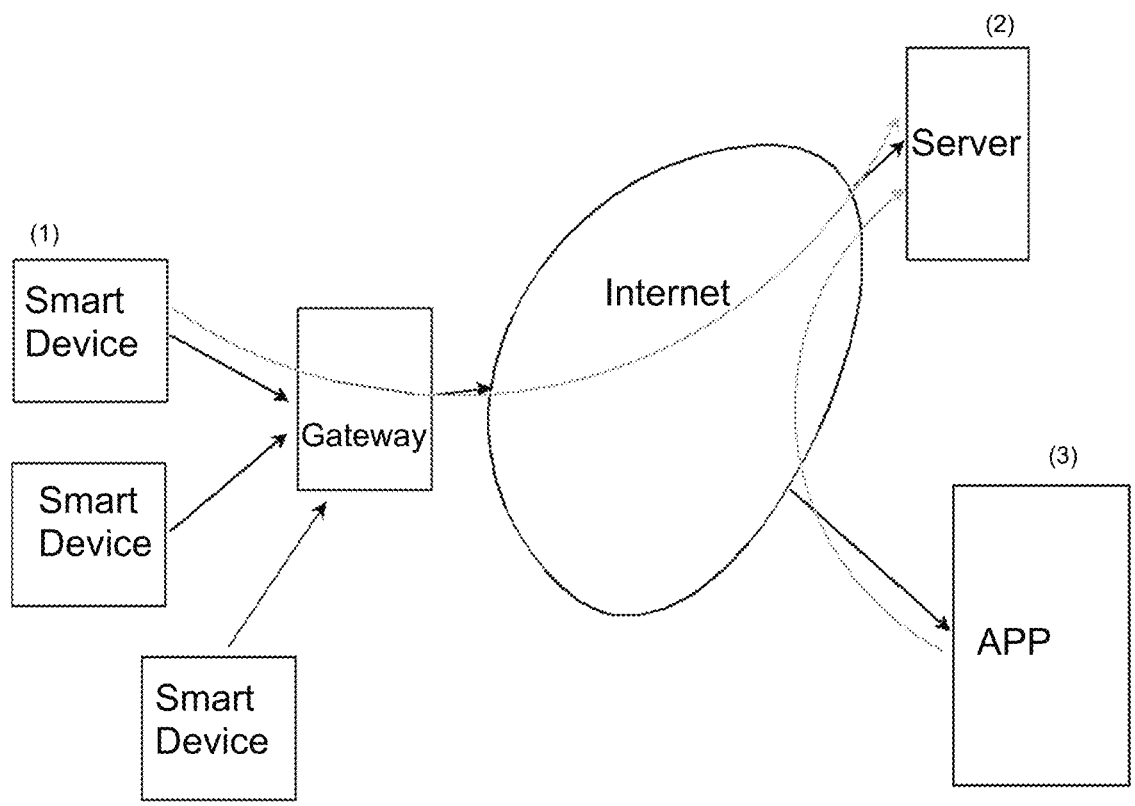
FIG. 1 is a schematic diagram of a conventional building automation system.

It should be understood that the drawing(s) are for purposes of illustrating the concepts of the disclosure and is not necessarily the only possible configuration for illustrating the disclosure.

DETAILED DESCRIPTION

The present description illustrates the principles of the present disclosure. It will thus be appreciated that those skilled in the art will be able to devise various arrangements that, although not explicitly described or shown herein, embody the principles of the disclosure and are included within its scope.

All examples and conditional language recited herein are intended for educational purposes to aid the reader in understanding the principles of the disclosure and the concepts contributed by the inventor to furthering the art, and are to be construed as being without limitation to such specifically recited examples and conditions.

Moreover, all statements herein reciting principles, aspects, and embodiments of the disclosure, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

Thus, for example, it will be appreciated by those skilled in the art that the block diagrams presented herein represent conceptual views of illustrative circuitry embodying the principles of the disclosure. Similarly, it will be appreciated that any flow charts, flow diagrams, state transition diagrams, pseudocode, and the like represent various processes which may be substantially represented in computer readable media and so executed by a computer or processor, whether or not such computer or processor is explicitly shown.

The functions of the various elements shown in the figures may be provided through the use of dedicated hardware as well as hardware capable of executing software in association with appropriate software. When provided by a processor, the functions may be provided by a single dedicated processor, by a single shared processor, or by a plurality of individual processors, some of which may be shared. Moreover, explicit use of the term "processor" or "controller" should not be construed to refer exclusively to hardware capable of executing software, and may implicitly include, without limitation, digital signal processor (DSP) hardware, read only memory (ROM) for storing software, random access memory (RAM), and nonvolatile storage.

Other hardware, conventional and/or custom, may also be included. Similarly, any switches shown in the figures are conceptual only. Their function may be carried out through the operation of program logic, through dedicated logic, through the interaction of program control and dedicated logic, or even manually, the particular technique being selectable by the implementer as more specifically understood from the context.

In the claims hereof, any element expressed as a means for performing a specified function is intended to encompass any way of performing that function including, for example, a) a combination of circuit elements that performs that function or b) software in any form, including, therefore, firmware, microcode or the like, combined with appropriate circuitry for executing that software to perform the function.

The disclosure as defined by such claims resides in the fact that the functionalities provided by the various recited means are combined and brought together in the manner which the claims call for. It is thus regarded that any means that can provide those functionalities are equivalent to those shown herein.

A Traditional Web Based Device (TWBD) is a smart device that can be connected to a network gateway using a wired or wireless (WiFi) interface. The TWBD requests and receives an Internet Protocol (IP) address from the network gateway. The end user may browse the web pages associated with at least one of the located TWBDs (smart devices), by inputting the at least one of the located TWBD's IP address or host name in any Internet browser, to obtain (retrieve) the status of the at least one of the located TWBDs, and/or operate the at least one of the located TWBDs via the components (buttons or input fields etc.) in the HTTP page to monitor and control the at least one of the located TWBDs. The at least one of the located TWBDs may or may not have any other way to obtain the status of or control the TWBD. The TWBD is not a computing device or user interface type device, like PC, work station, laptop, notebook, iPhone/iPad and so on but the TWBD may have an embedded processor or controller.

A Smart Network Gateway (SNG) is a major component in the proposed method and apparatus. The SNG has the full functionality of a network gateway and be accessible from the Internet using HTTPS connections. The SNG works as a proxy to forward some given URL HTTPS connection requests to the local area network (LAN) side. The SNG also forwards any reply (response) packets from LAN side to the Internet.

The Shared Device Management Server (SDMS) is a partner of the SNG and should be accessible from the Internet by fixed IP address or domain name. The SDMS should also be accessible from the SNG so that the SNG may add/remove a TWBD record and any related information, including at least a URL (HTTP link) to open the TWBD management page. TWBD records may be added or removed from the SDMS when a user purchases (buys, acquires) a new device and/or disposes a TWBD. The SDMS is also accessible from the SDMA and provide the list of TWBD registered devices to the SDMA.

The Shared Device Management APP (SDMA) is an APP installed in client devices. The SDMA provides an interface to the end user to open the management page of the TWBDs.

The proposed method and apparatus provides the smart device manufacturer with a low-cost solution, which may enable a traditional HTTP smart device interface to be accessible both from the Internet and the LAN-side via a shared mobile phone APP. In other words, the manufacturer of a smart product/device/appliance, need only provide an HTTP page interface (HTTP URL) so that the end user can open the smart device control page using the shared APP (SDMA) installed in a client device via the Internet or the LAN network, to obtain (retrieve) the status of the smart device and to control the smart device.

The smart device manufacturer need not develop software in the device to support APP access. The smart device manufacturer need not setup (create and maintain) a server to handle remote login and management. The smart device manufacturer need not develop an APP for multiple client device platforms, such as IOS, android, or even mobile windows.

Figure 2:
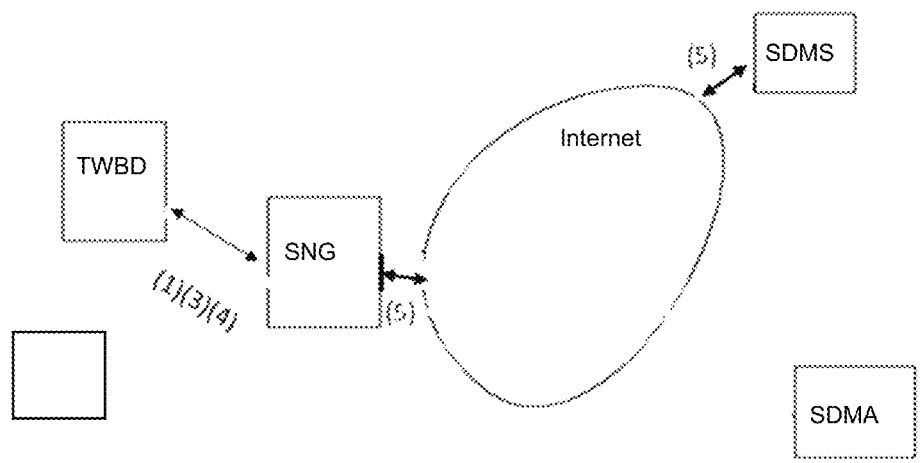
FIG. 2 is a schematic diagram of an exemplary portion of the proposed method dealing with detection and registration of a TWBD in accordance with the principles of the proposed method and apparatus.

FIG. 2 is a schematic diagram of an exemplary portion of the proposed method dealing with detection and registration of a TWBD in accordance with the principles of the proposed method and apparatus. The TWBD is in bi-directional communication (interacts) with the SNG, which is in bi-directional communication (interacts) with the SDMS via the internet. There is no communication (interaction) with the SDMA at this point since the smart device is in this phase registering with the shared server (SDMS).

Figure 3:
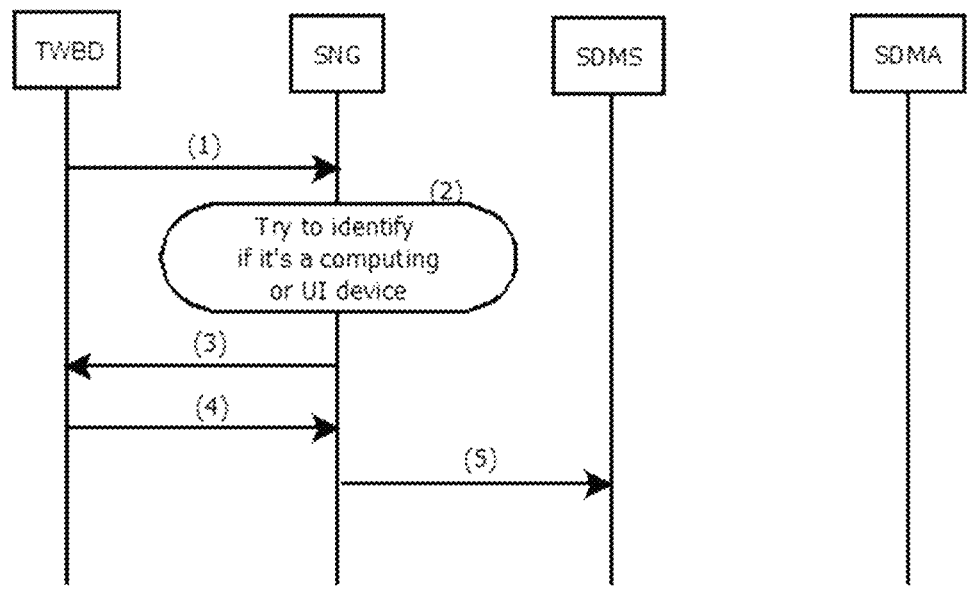
FIG. 3 is a ladder diagram of an exemplary portion of the proposed method dealing with detection and registration of a TWBD in accordance with the principles of the proposed method and apparatus.

FIG. 3 is a ladder diagram of an exemplary portion of the proposed method dealing with detection and registration of a TWBD in accordance with the principles of the proposed method and apparatus. The TWBD connects with the SNG. At step (flow) (1), upon being placed in service by the user the TWBD device. When TWBD establishes a connection with the SNG using the wired or wireless interface, the TWBD requests an IP address assigned by the dynamic host configuration protocol (DHCP) service of the SNG. Normally the TWBD will also supply some additional information to the SNG in the DHCP request packets. This information may include vendor (manufacturer) name, product model, serial number etc. After an IP address is assigned to TWBD, the SNG then attempts at step (flow) (2) to determine if the smart device (TWBD) is a computing device or user interface device. Computing devices (computers) and user interface devices are treated differently since they are most likely to be controlled by a human accessing such devices directly and are, thus, unlikely to have a URL available to direct a user to a HTTP page to control the computing or user interface device. At step (flow) (3) if the TWBD is not a computing device or user interface device, the SNG request the HTTP page from this device via the URL http://XXX.XXX.XXX.XXX, which is the LAN side IP address of the TWBD. If the connection was established and the URL was supplied to the SNG by the TWBD so that the HTTP page can be accessed, then at step (flow) (4) the SNG would regard this device as a TWBD going forward. At step (flow) (5), the SNG establishes a connection to the SDMS, to register the TWBD with the SDMS, with the necessary information of the TWBD. The most important information about the TWBD is the TWBD URL, which is a HTTPS URL to access the web page for the TWBD and is also used to protect the privacy and security of the user (owner) of the TWBD from attacks to gain access to private information of the user (owner). Access to a user's (owner's) private information may result in identity theft. Also, a unique hash code provides further guarantees that only the owner (user) of the TWBD can access the user (owner's) TWBD. The unique hash code should be included in the TWBD URL. The host part of this TWBD URL is the WAN side IP address of the SNG. The WAN side is the SDMS side of the SNG. Using the TWBD URL, the user (owner) of the TWBD can access the TWBD through the APP on the SDMA and through the Internet. Completion of registration results in the creation of a user (owner) account.

Figure 4:
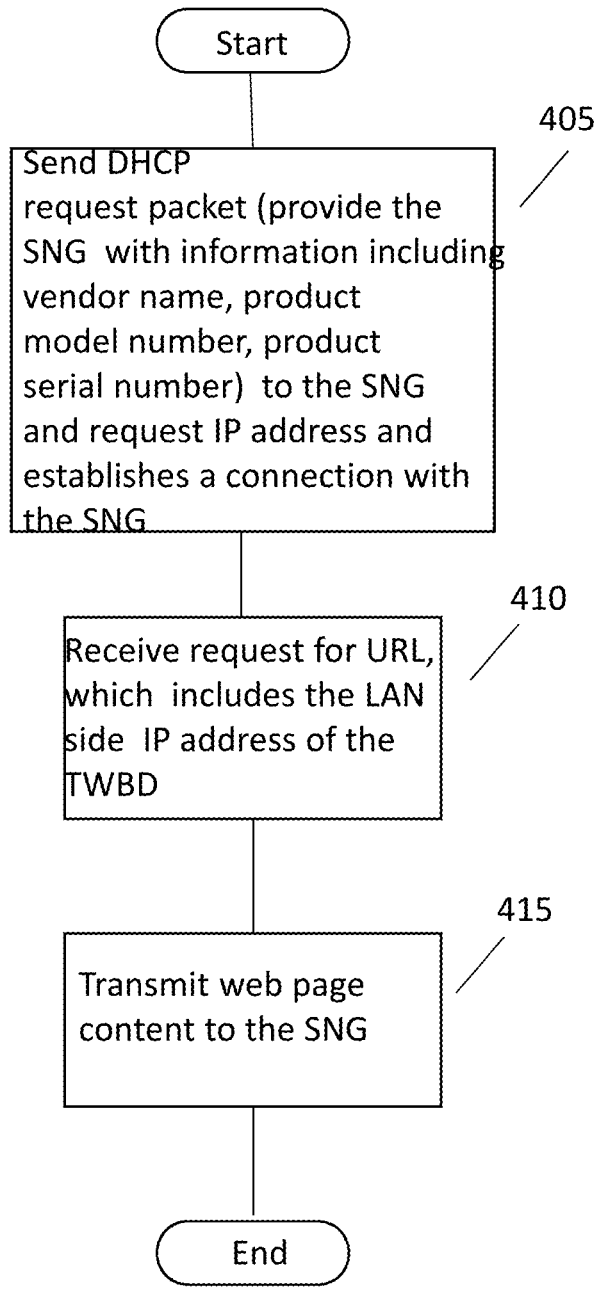
FIG. 4 is a flowchart of an exemplary embodiment of a TWBD in accordance with the principles of the proposed method for the registration of the TWBD from the perspective of the TWBD.

FIG. 4 is a flowchart of an exemplary embodiment of a TWBD in accordance with the principles of the proposed method for the registration of the TWBD from the perspective of the TWBD. At 405 the TWBD provides the SNG with information about the TWBD including the vendor (manufacturer) name, the TWBD model number, the TWBD serial number in the DHCP request packet to request an IP address from the DHCP service portion of the SNG and establishes a connection with the SNG. At 410 the TWBD receives a request for the URL from the SNG. The request includes the LAN-side IP address of the TWBD. At 415 the TWBD transmits WEB page content (device home page) to the SNG.

Figure 5:
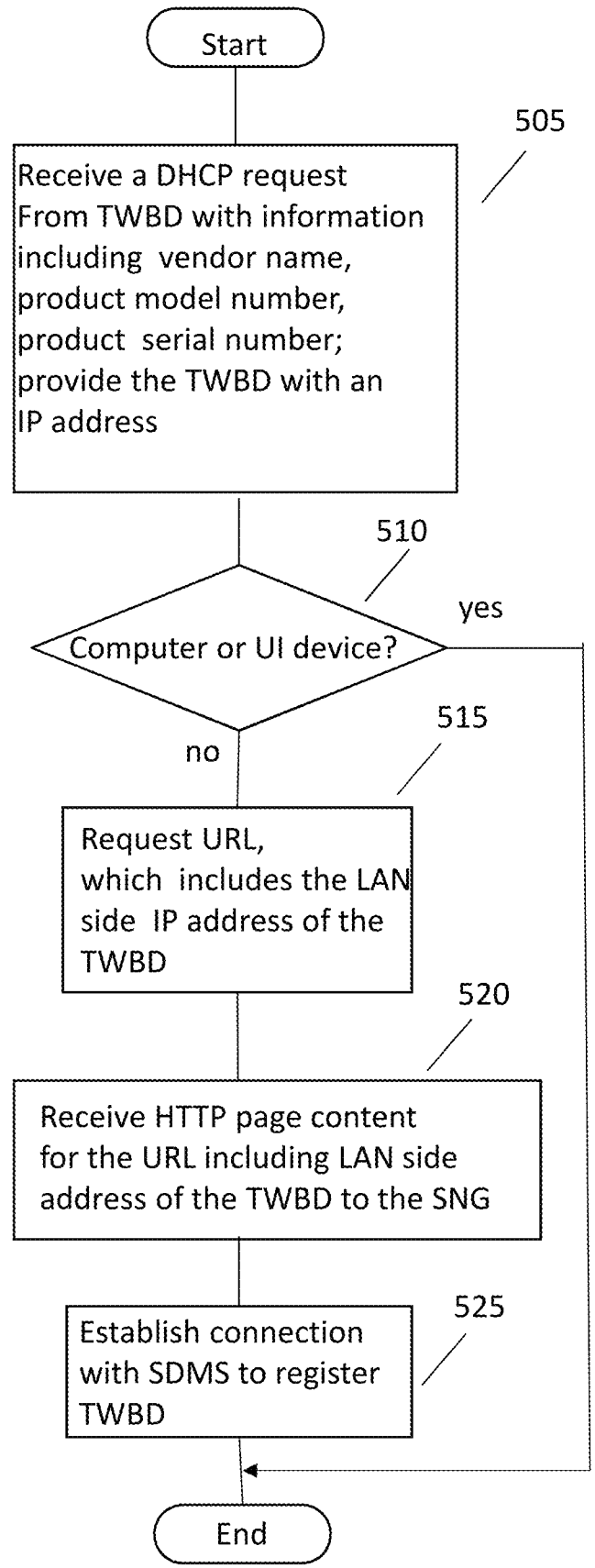
FIG. 5 is a flowchart of an exemplary embodiment of a SNG in accordance with the principles of the proposed method for the registration of the TWBD from the perspective of the SNG.

FIG. 5 is a flowchart of an exemplary embodiment of a SNG in accordance with the principles of the proposed method for the registration of the TWBD from the perspective of the SNG. At 505 the SNG receives a DHCP request packet from TWBD to request an IP address from a TWBD with information including vendor (manufacturer) name, TWBD model number, TWBD serial number. The SNG works as a DHCP server and provides the TWBD with an IP address. At 510 a test is performed to determine if the TWBD is a computer (computing device) or a user interface (UI) device. If the TWBD is a computer or UI device then processing ends. If the TWBD is not a computer or UI device then at 515 the SNG tries to open and request a HTTP page to the TWBD by a URL, which includes the LAN-side IP address of the TWBD. At 520 the SNG receives the HTTP page content for the URL, including the LAN-side address of the TWBD, from the TWBD. At 525 the SNG establishes a connection with the SDMS in order to register the TWBD. The registering information for each TWBD includes a URL, which is a HTTPS URL, including the global IP address of the SNG (as the base URL), and a device ID (like hash string) associated with this TWBD. The URL with the LAN-side IP address is not accessible from the Internet. The SNG handles the HTTPS URL and forwards the HTTP request from the global URL to the LAN-side URL. The HTTPS URL looks like https://123.23.22.11/twbd/223344, in which https://123.23.22.11 is the base URL and 223344 is the device identification (ID) of a given TWBD device.

Figure 6:
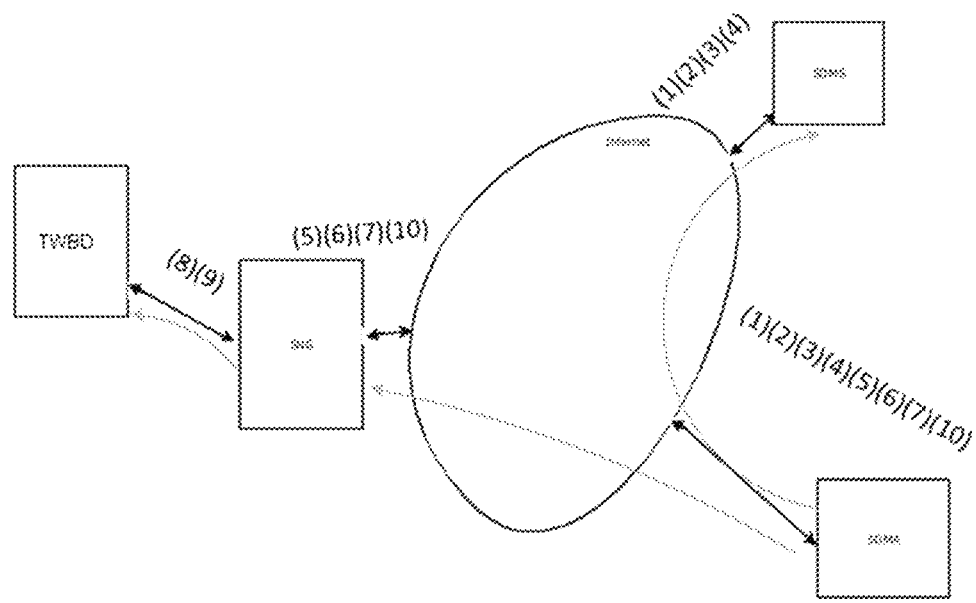
FIG. 6 is a schematic diagram of an exemplary portion of the proposed method dealing with accessing the TWBD from the SDMA through the Internet in accordance with the principles of the proposed method and apparatus.

FIG. 6 is a schematic diagram of an exemplary portion of the proposed method dealing with accessing the TWBD from the SDMA through the Internet in accordance with the principles of the proposed method and apparatus. The TWBD is in bi-directional communication with the SN. The SNG is in bi-directional communication with both the SDMA and the SDMS through the Internet. At this point the TWBD has already registered with the SDMS through the SNG.

Figure 7:
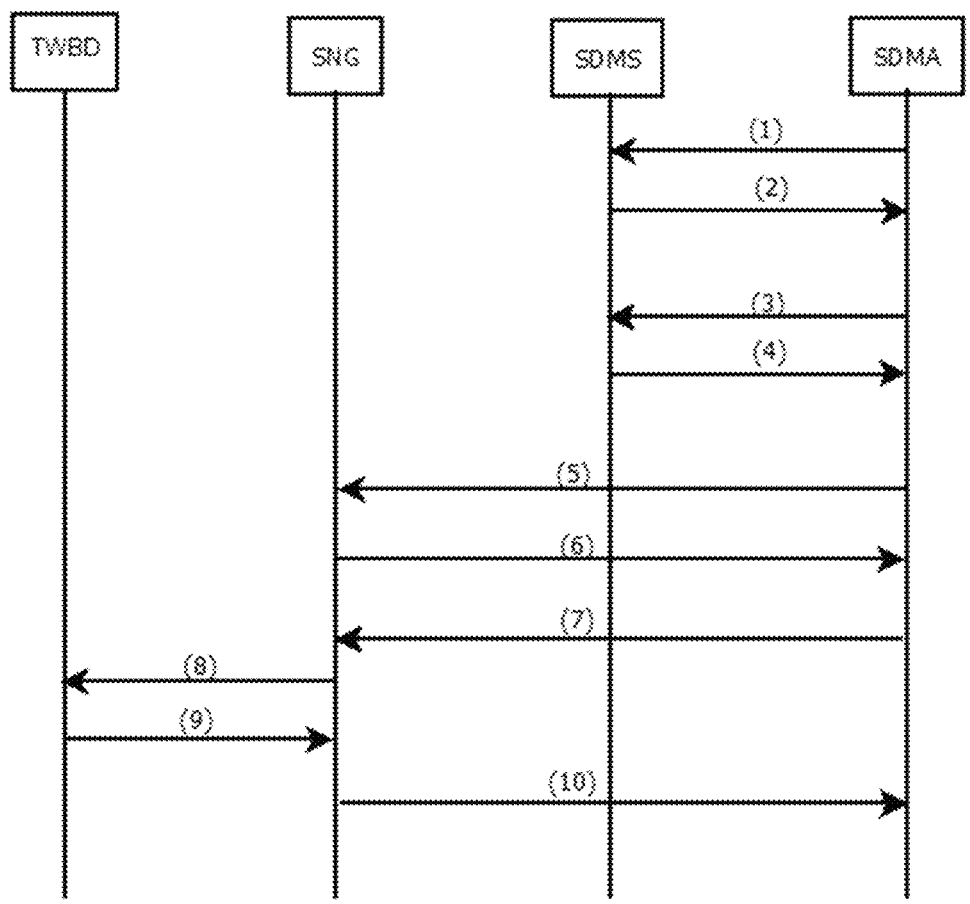
FIG. 7 is a ladder diagram of an exemplary portion of the proposed method dealing with accessing the TWBD from the SDMA through the Internet in accordance with the principles of the proposed method and apparatus.

FIG. 7 is a ladder diagram of an exemplary portion of the proposed method dealing with accessing the TWBD from the SDMA through the Internet in accordance with the principles of the proposed method and apparatus. In accordance with the proposed method and apparatus, the end user (owner) can access his/her TWBD installed in an environment using a SDMA (Android/iOS/windows and so on) through the Internet. Activating the APP on the client device includes establishing a connection with the SDMS and providing the user's (owner's) credentials in order to log-on the user's (owner's) account on the SDMS. At step (flow) (2) the SDMS responds to the user's (owner's) log-on request using the SDMA through the Internet. At step (flow) (3) the SDMA transmits (forwards) a request to the SDMS for a list of TWBD devices registered to the user's (owner's) account. At step (flow) (4) the SDMS transmits (forwards, sends) the list of TWBD devices to the SDMA through the Internet. The list of TWBD devices includes the HTTPS URLs associated with each device. A list of all TWBDs registered with the SDMA is displayed for the end user (owner) on the SDMA APP. In the meantime, the SDMA will setup a HTTPS connection to the SNG. After the HTTPS connection is established, at steps (flows) (5 and 6) the SNG authenticates the user, which authorizes the SDMA user to access the SNG and the TWBD devices in LAN-side network behind the SNG. The user (owner) authentication is accomplished by transmitting (forwarding) the end user's (owner's) credentials to the SNG at step (flow) (5). The SNG responds to the user (owner) authentication request at step (flow) (6). Then, at step (flow) (7), the SDMA tries to link to the TWBD HTTPS URL in this authorized HTTPS session to browse and control the TWBD, by clicking on the TWBD in the list of registered TWBD devices received from the SDMS.

The web server in the SNG works as a web proxy. The HTTPS URL is set as the base URL of the selected (corresponding) TWBD. All the HTTPS requests based on this base URL to the TWBD are redirected as HTTP requests to the TWBD by LAN-side URL. At the LAN-side, the request is an HTTP request but not an HTTPS request. The HTTP request includes the local IP address URL but not the global IP address. At step (flow) (8), the SNG transmits (forwards, sends) the request to open a HTTP connection to the TWBD. At step (flow) (9), the TWBD replies to the HTTP requests to the SNG. At step (flow) (10), the SNG forwards (transmits, sends) all replies from the TWBD to the SDMA via the HTTPS connection. The steps (flows) (7 and 10) are handled using an HTTPS connection to protect the user's (owner's) private information and prevent identity theft. Step 7 to 10 may be repeated as many times as necessary to finish the desired operation(s) of the end user (owner).

The SNG working as an HTTPS proxy supports both GET and POST HTTPS requests. If possible, the web socket should also be supported, to enable the TWBD to update its status to SDMA.

Figure 8:
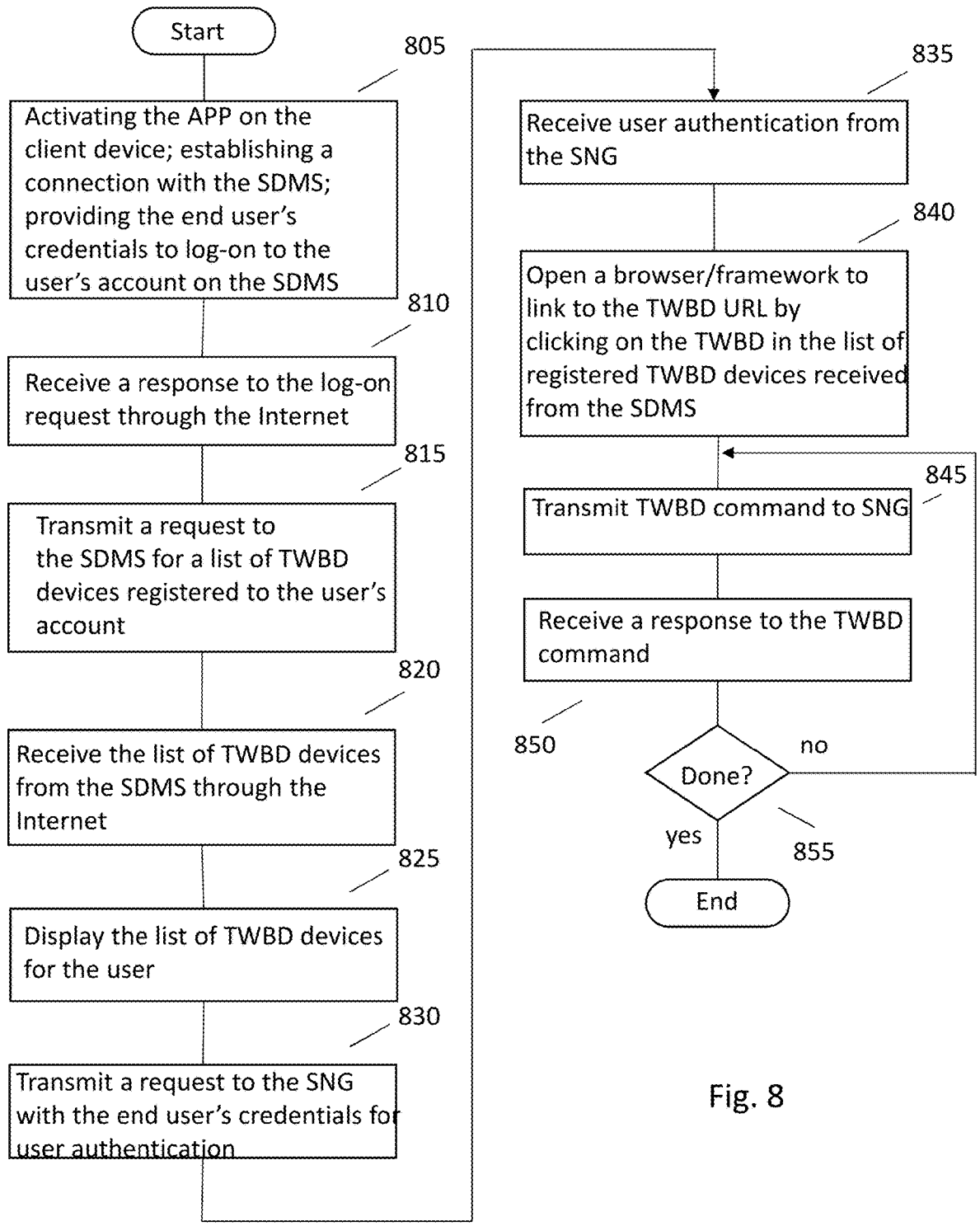
FIG. 8 is a flowchart of an exemplary embodiment of the proposed method for accessing the TWBD through the Internet from the perspective of the SDMA.

FIG. 8 is a flowchart of an exemplary embodiment of the proposed method for accessing the TWBD through the Internet from the perspective of the SDMA. At 805 the end user (owner) activates the SDMA and establishes a connection with the SDMS. The end user (owner) provides (forwards, transmits, sends) the end user's (owner's) credentials along with the request to establish the connection so that the end user (owner) can log-on to the end user's (owner's) account on the SDMS. At 810 the SDMA receives a response to the log-on request from the SDMS through the Internet. At 815 the SDMA transmits (provides, sends, forwards) a request to the SDMS for a list of the TWBD devices registered to the end user's (owner's) account. At 820 the SDMA receives the list of TWBD devices from the SDMS through the Internet. At 825 the SDMA displays the list for the end user (owner). At 830 the SDMA transmits (forwards, sends) a request to the SNG with the end user's (owner's) credentials for user authentication. At 835 the SDMA receives user authentication from the SNG through the Internet. User authentication authorizes (allows, permits) the end user (owner) to monitor and control the TWBD. At 840 the SDMA opens the HTTPS URL in the authorized HTTPS session to link to the TWBD URL by clicking on (by the end user) the TWBD in the list of registered TWBD devices displayed on the SDMA. At 845 the SDMA transmits a command to the SNG through the Internet. At 850 the SDMA receives a response to the TWBD command. At 855 the SDMA performs a test to determine if the end user has finished or has further commands for the TWBD device. If the end user (owner) has no further commands for the TWBD device then processing ends. If the end user (owner) has further commands for the TWBD device then processing proceeds to 845.

Figure 9:
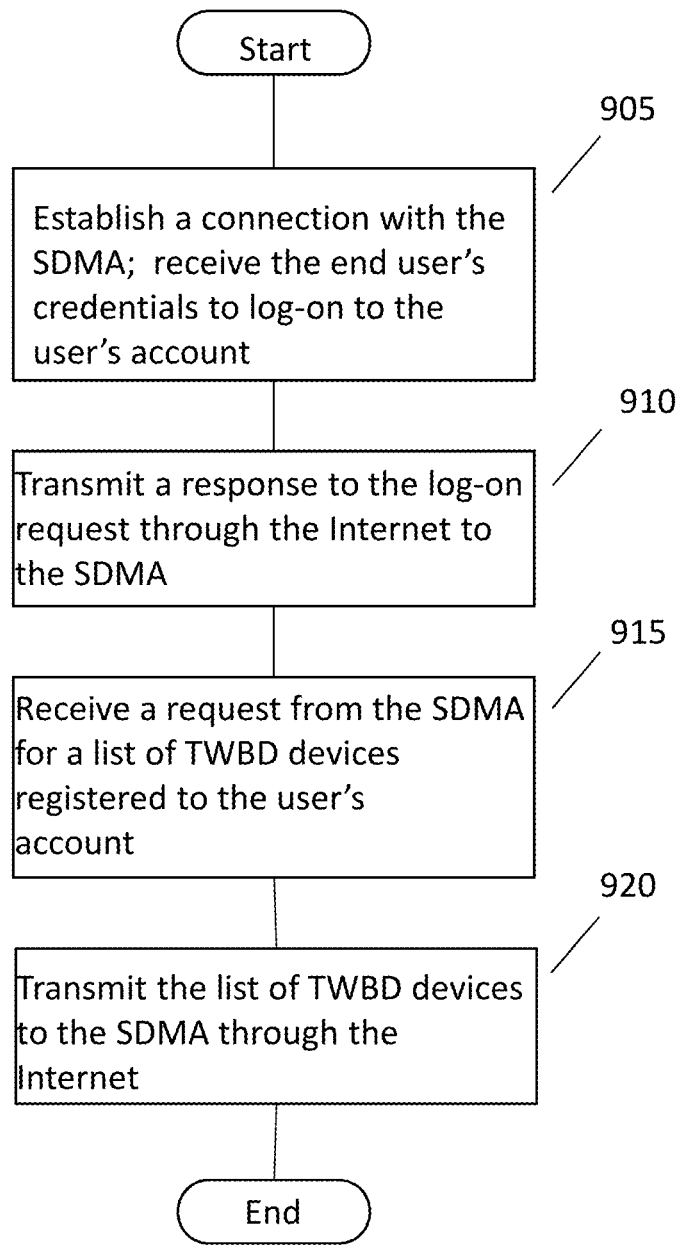
FIG. 9 is a flowchart of an exemplary embodiment of the proposed method for accessing the TWBD through the Internet from the perspective of the SDMS.

FIG. 9 is a flowchart of an exemplary embodiment of the proposed method for accessing the TWBD through the Internet from the perspective of the SDMS. 905 the SDMS establishes a connection with the SDMA and receives the end user's (owner's) credentials to log-on to the user's account on the SDMS. At 910 the SDMS transmits a response to the log-on request through the Internet to the SDMA. At 915 the SDMS receives a request from the SDMA for a list of TWBD devices registered to the user's (owner's) account. At 920 the SDMS transmits the list of TWBD devices to the SDMA through the Internet.

Figure 10:
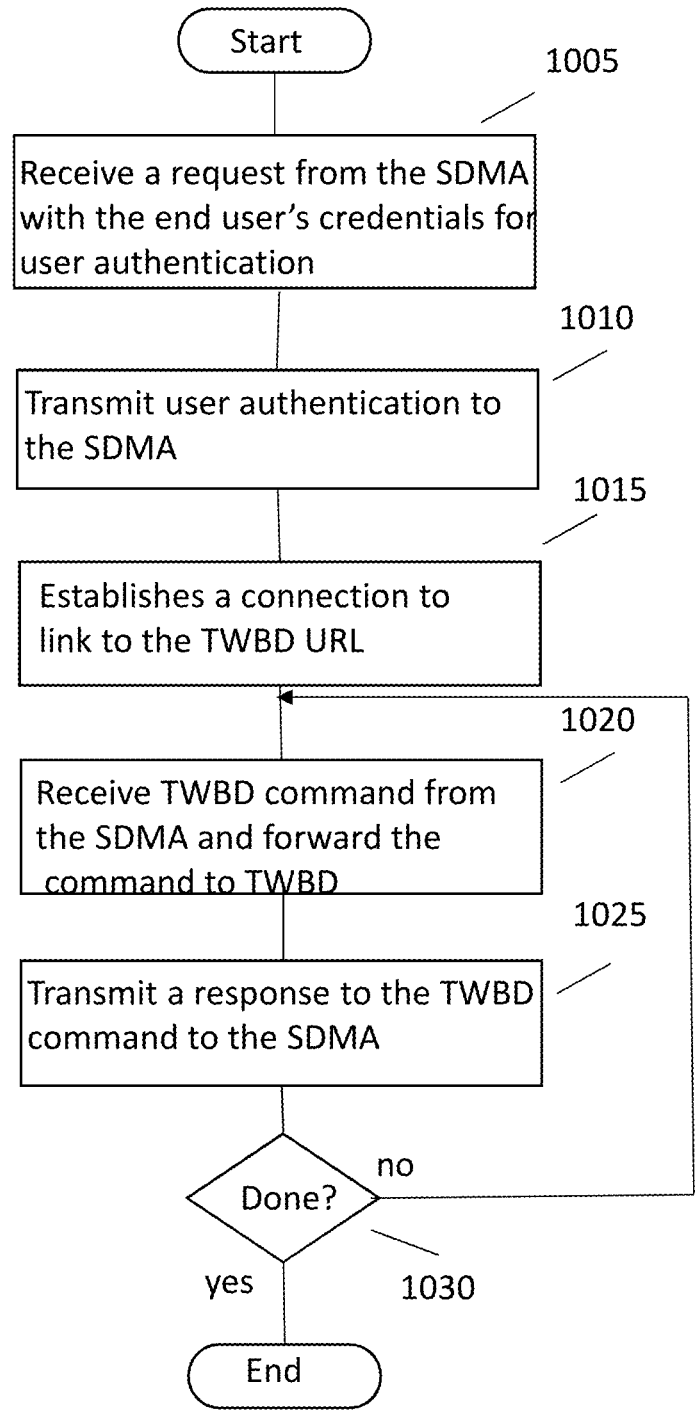
FIG. 10 is a flowchart of an exemplary embodiment of the proposed method for accessing the TWBD through the Internet from the perspective of the SNG.

FIG. 10 is a flowchart of an exemplary embodiment of the proposed method for accessing the TWBD through the Internet from the perspective of the SNG. At 1005 at SNG receives a request from the SDMA with the end user's (owner's) credentials for user authentication. At 1010 the SNG transmits (forwards, sends, provides) a response to the request for user authentication to the SDMA through the Internet. At 1015 the SNG establishes a connection to link to the TWBD URL. At 1020 the SNG receives a TWBD command from the SDMA through the Internet. SNG works as a proxy to forward this HTTP command to the TWBD and forwards the TWBD command to the TWBD. At 1025 the SNG receives a response to the HTTP command to the TWBD and the SNG then transmits (forwards, sends, provides) the response to the HTTP command to the SDMA through the Internet. At 1030 the SNG performs a test to determine if the end user has finished or has further commands for the TWBD device. If the end user (owner) has no further commands for the TWBD device then processing ends. If the end user (owner) has further commands for the TWBD device then processing proceeds to 1020.

Figure 11:
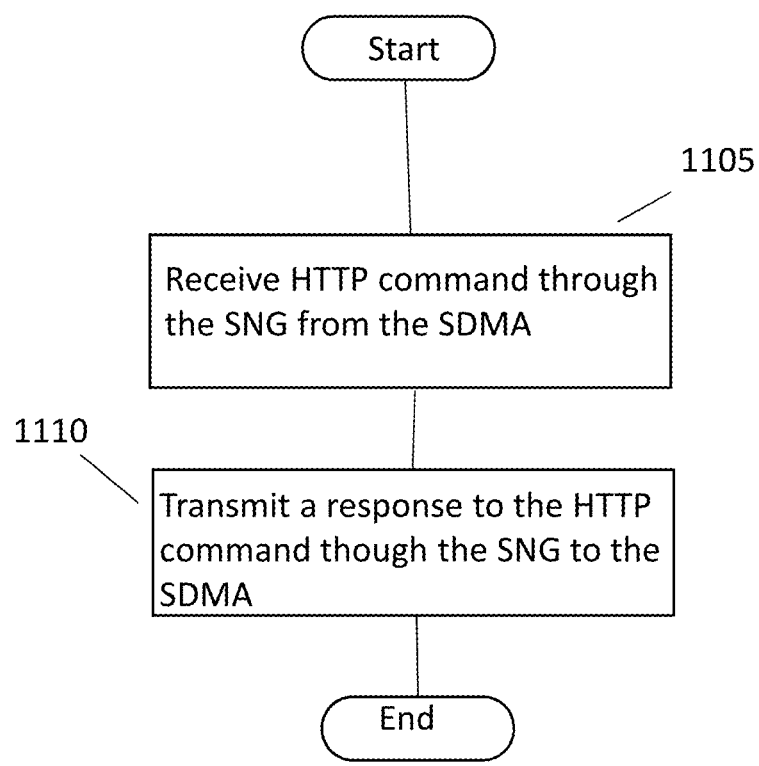
FIG. 11 is a flowchart of an exemplary embodiment of the proposed method for accessing the TWBD through the Internet from the perspective of the TWBD.

FIG. 11 is a flowchart of an exemplary embodiment of the proposed method for accessing the TWBD through the Internet from the perspective of the TWBD. At 1105 the TWBD receives a HTTP command from the SDMA through the SNG and the Internet. At 1110 the TWBD transmits (forwards, sends, provides) a response to the HTTP command to the SDMA through the SNG and the Internet.

Figure 12:
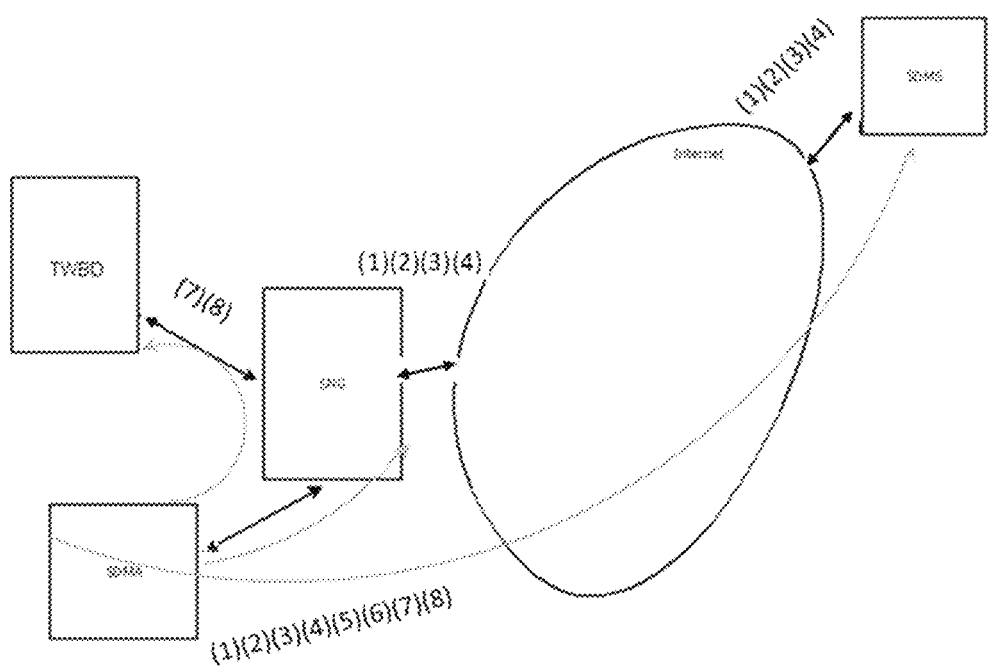
FIG. 12 is a schematic diagram of an exemplary portion of the proposed method dealing with accessing the TWBD from the SDMA from the local network of the SNG in accordance with the principles of the proposed method and apparatus.

FIG. 12 is a schematic diagram of an exemplary portion of the proposed method dealing with accessing the TWBD from the SDMA from the local network of the SNG in accordance with the principles of the proposed method and apparatus. The TWBD and the SDMA are both in bi-directional communication with the SNG. The SNG is in bi-directional communication with the SDMS through the Internet.

Figure 13:
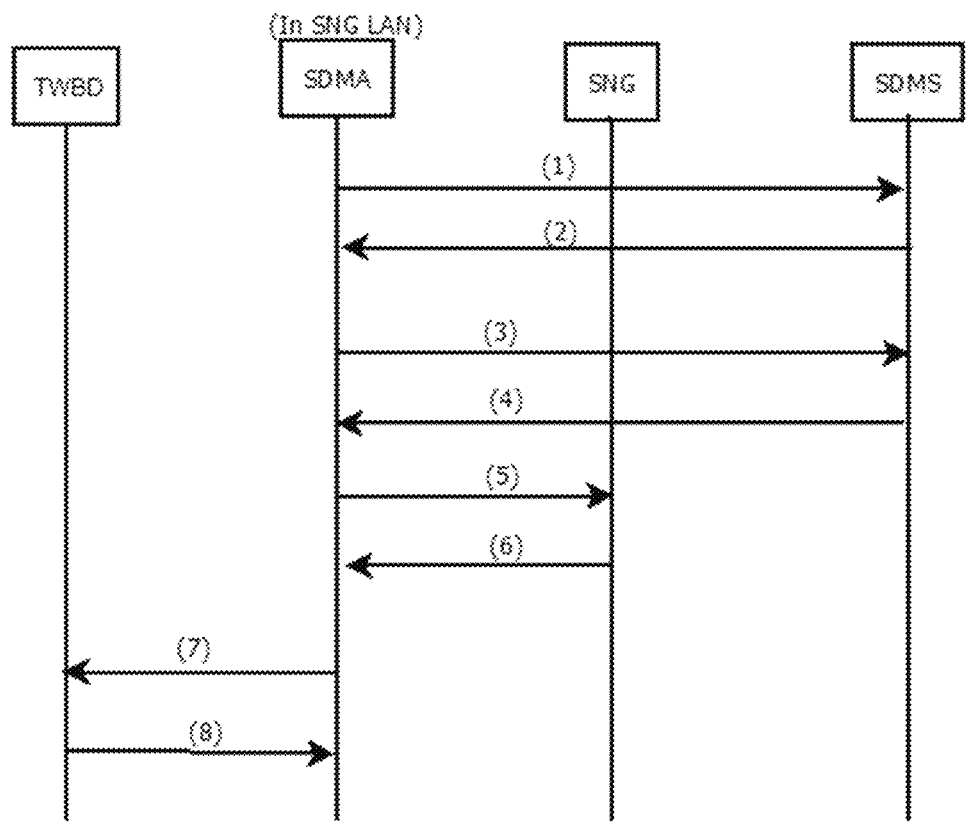
FIG. 13 is a ladder diagram of an exemplary portion of the proposed method dealing with accessing the TWBD from the SDMA from the local network of the SNG in accordance with the principles of the proposed method and apparatus.

FIG. 13 is a ladder diagram of an exemplary portion of the proposed method dealing with accessing the TWBD from the SDMA from the local network of the SNG in accordance with the principles of the proposed method and apparatus. In this scenario, the end user (owner) connects to the SNG either by wired line or wireless (WiFi) in the environment to open the SDMA to browse the his/her TWBDs. The end user in this scenario is on the LAN side of the SNG. In accordance with the proposed method and apparatus, the end user (owner) can access his/her TWBD installed in an environment using a SDMA (Android/iOS/windows and so on) through the LAN in the environment. Communication between the SDMA and the SDMS passes through the SNG and the Internet. Activating the APP on the client device includes establishing a connection with the SDMS and providing the user's (owner's) credentials in order to log-on the user's (owner's) account on the SDMS. At step (flow) (2) the SDMS responds to the user's (owner's) log-on request using the SDMA through the LAN and through the Internet. At step (flow) (3) the SDMA transmits (forwards) a request to the SDMS for a list of TWBD devices registered to the user's (owner's) account through the SNG (and LAN) and the Internet. At step (flow) (4) the SDMS transmits (forwards, sends) the list of TWBD devices to the SDMA through the SNG (through the LAN and the Internet). The list of TWBD devices includes the HTTPS URLs associated with each device. A list of all TWBDs registered with the SDMA is displayed for the end user (owner) on the SDMA APP.

After the HTTPS connection is established, at steps (flows) (5 and 6) the SNG authenticates the user, which authorizes the SDMA user to monitor and control the TWBD. The user (owner) authentication is accomplished by transmitting (forwarding) the end user's (owner's) credentials to the SNG at step (flow) (5). The SNG is able to determine whether the request is from the wide area network (WAN) side or LAN side, for example, by checking the source IP address. In the scenario of FIG. 7, the request is from the LAN side so the SNG would not authorize the SDMA, but at step (flow) (6) return a redirecting page to the SDMA, to redirect the TWBD to the URL http://XXX.XXX.XXX.XXX.

The IP address of the TWBD is XXX.XXX.XXX.XXX. After that, the SDMA would send HTTP requests to the TWBD directly.

Then, at step (flow) (7), the SDMA opens a browser/framework to link to the TWBD URL by clicking on the TWBD in the list of registered TWBD devices received from the SDMS. Also at step (flow) (7) the end use (owner) using the SDMA issues (forwards, sends, transmits) commands to the TWBD. At step (flow) (8), the TWBD replies to the HTTPS requests to the SDMA. Steps (flows) (7 and 8) may be repeated as many times as necessary to perform or finish the commands (control) of the desired operation(s) of the end user (owner).

Figure 14:
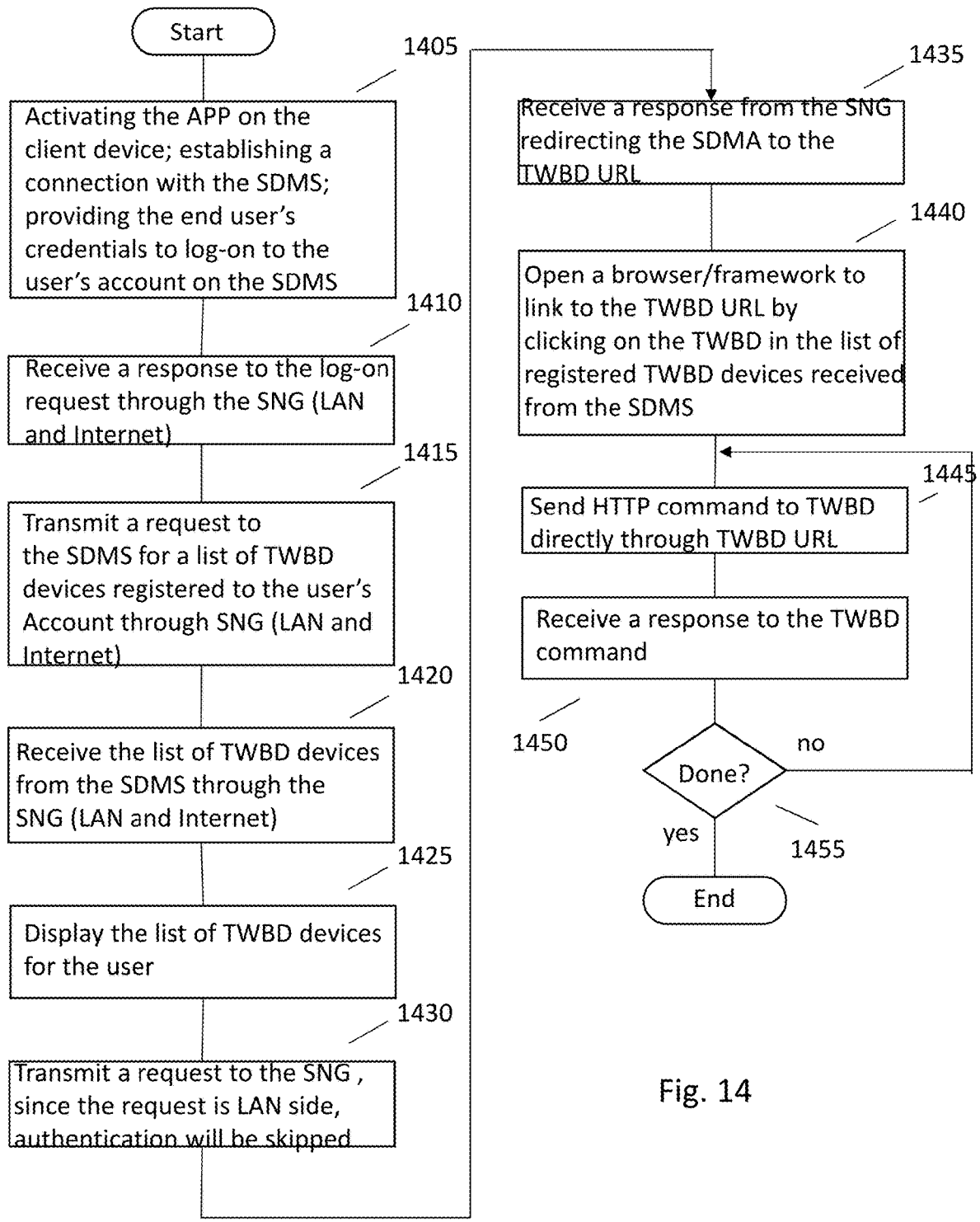
FIG. 14 is a flowchart of an exemplary embodiment of the proposed method for accessing the TWBD through the SNG (LAN and Internet) from the perspective of the SDMA.

FIG. 14 is a flowchart of an exemplary embodiment of the proposed method for accessing the TWBD through the SNG (LAN and Internet) from the perspective of the SDMA. At 1405 the end user (owner) activates the SDMA and establishes a connection with the SDMS through the SNG (LAN and Internet). The end user (owner) provides (forwards, transmits, sends) the end user's (owner's) credentials along with the request to establish the connection so that the end user (owner) can log-on to the end user's (owner's) account on the SDMS. At 1410 the SDMA receives a response to the log-on request from the SDMS through the SNG (LAN and Internet). At 1415 the SDMA transmits (provides, sends, forwards) a request to the SDMS through the SNG (LAN and Internet) for a list of the TWBD devices registered to the end user's (owner's) account. At 1420 the SDMA receives the list of TWBD devices from the SDMS through the SNG (LAN and Internet). At 1425 the SDMA displays the list for the end user (owner).

At 1430 the SDMA transmits (forwards, sends) a request to the SNG with the end user's (owner's) credentials for user authentication. At 1435 the SDMA a response redirecting the SDMA to the TWBD URL. At 1440 the SDMA opens a browser/framework to link to the TWBD URL by clicking on (by the end user) the TWBD in the list of registered TWBD devices displayed on the SDMA. At 1445 the SDMA transmits a command to the TWBD through the TWBD URL. At 1450 the SDMA receives a response to the TWBD command. At 1455 the SDMA performs a test to determine if the end user has finished or has further commands for the TWBD device. If the end user (owner) has no further commands for the TWBD device then processing ends. If the end user (owner) has further commands for the TWBD device then processing proceeds to 1445.

Figure 15:
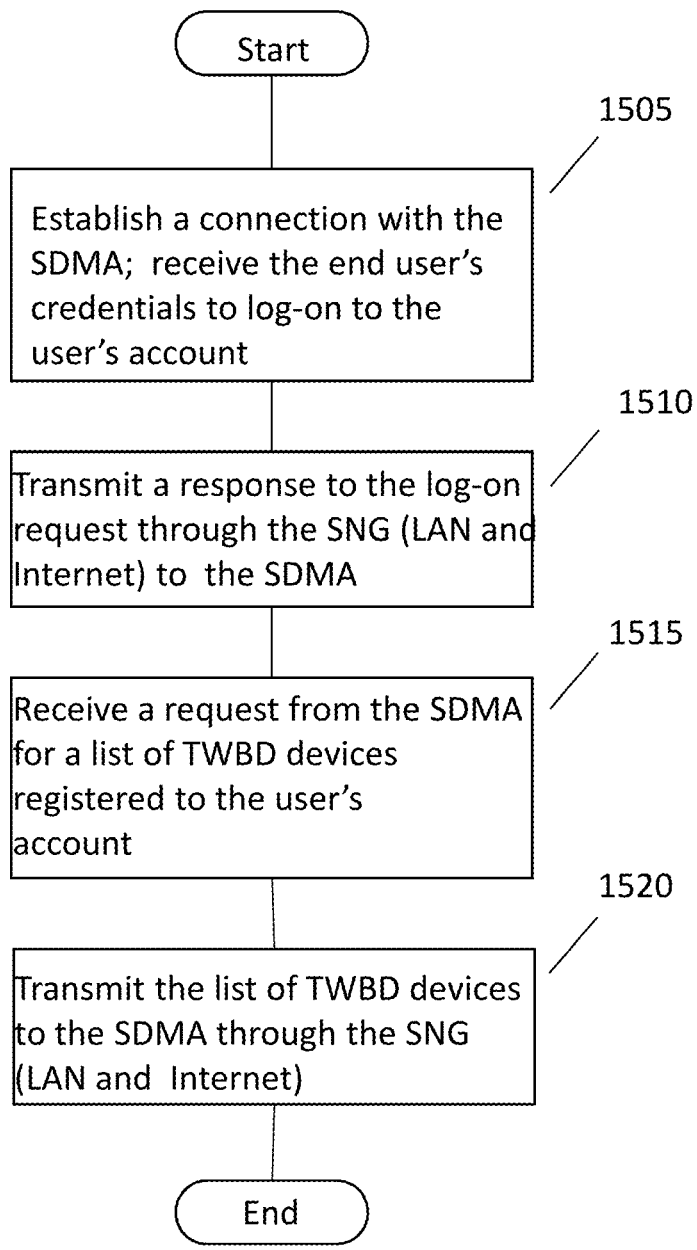
FIG. 15 is a flowchart of an exemplary embodiment of the proposed method for accessing the TWBD through the Internet from the perspective of the SDMS.

FIG. 15 is a flowchart of an exemplary embodiment of the proposed method for accessing the TWBD through the Internet from the perspective of the SDMS. At 1505 the SDMS establishes a connection with the SDMA and receives the end user's (owner's) credentials to log-on to the user's account on the SDMS. At 1510 the SDMS transmits a response to the log-on request through the SNG (LAN and Internet) to the SDMA. At 1515 the SDMS receives a request from the SDMA for a list of TWBD devices registered to the user's (owner's) account. At 1520 the SDMS transmits the list of TWBD devices to the SDMA through the SNG (LAN and Internet).

Figure 16:
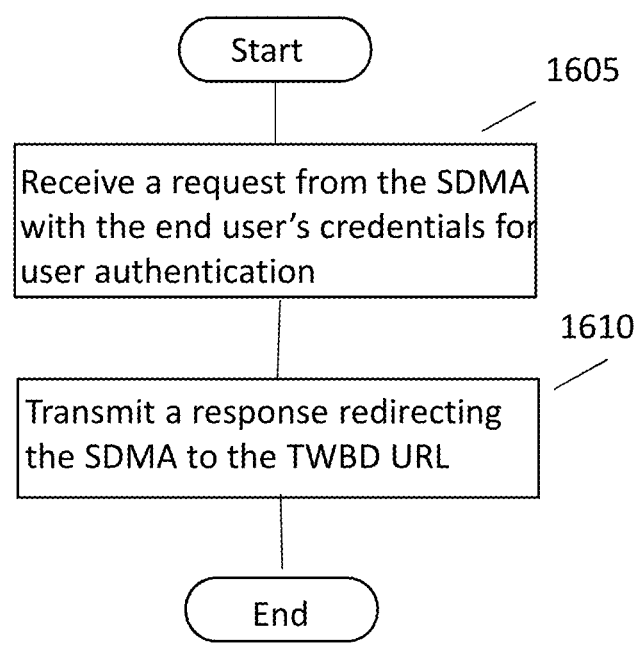
FIG. 16 is a flowchart of an exemplary embodiment of the proposed method for accessing the TWBD from the perspective of the SNG.

FIG. 16 is a flowchart of an exemplary embodiment of the proposed method for accessing the TWBD from the perspective of the SNG. At 1605 at SNG receives a request from the SDMA with the end user's (owner's) credentials for user authentication. At 1610 the SNG transmits (forwards, sends, provides) a response to the request redirecting the SDMA to the TWBD URL.

Figure 17:
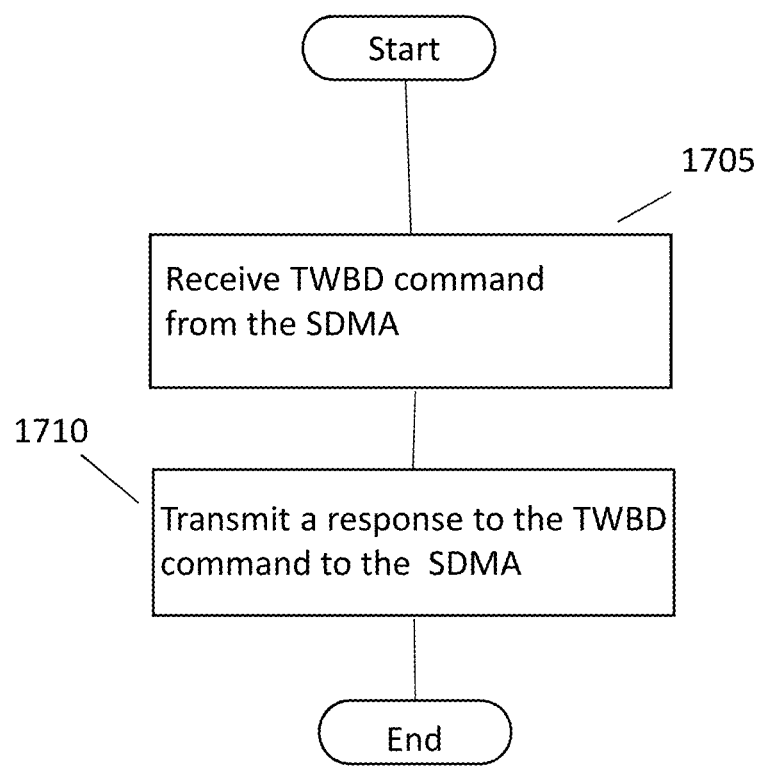
FIG. 17 is a flowchart of an exemplary embodiment of the proposed method for accessing the TWBD from the perspective of the TWBD.

FIG. 17 is a flowchart of an exemplary embodiment of the proposed method for accessing the TWBD from the perspective of the TWBD. At 1705 the TWBD receives a TWBD command from the SDMA. At 1710 the TWBD transmits (forwards, sends, provides) a response to the HTTP command to the SDMA. The HTTP command may be an HTTP get or an HTTP post.

Figure 18:
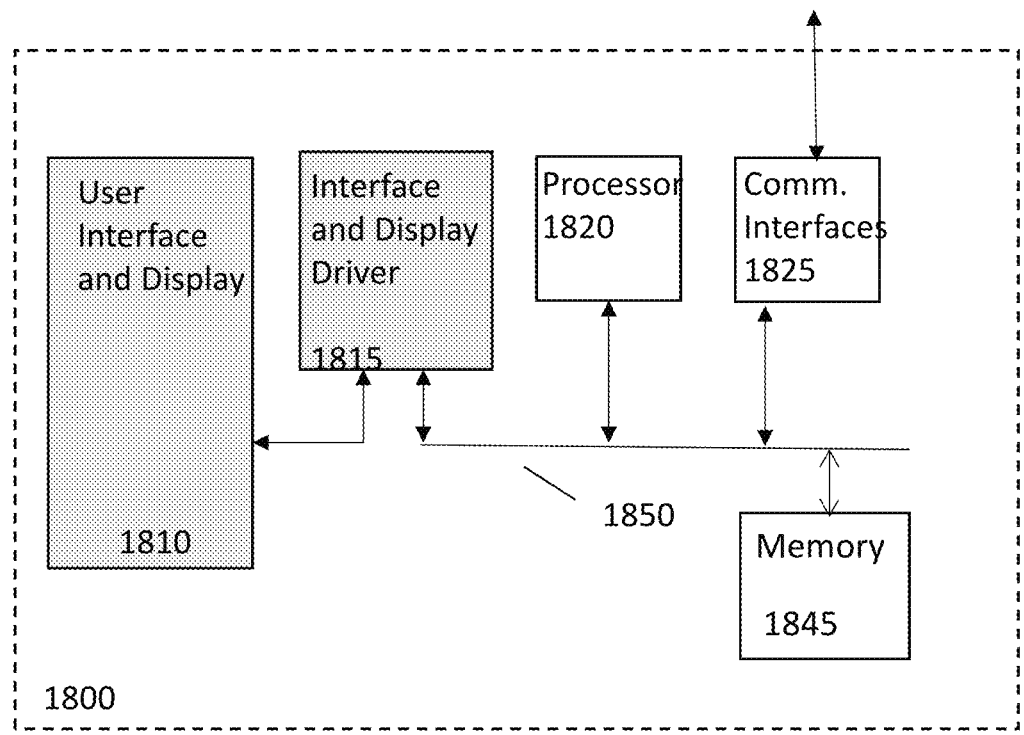
FIG. 18 is a block diagram of an exemplary embodiment of a SNG for practicing the proposed method.

FIG. 18 is a block diagram of an exemplary embodiment of an SNG for practicing the proposed method. The block diagram configuration includes a bus-oriented 1850 configuration interconnecting a processor (processing unit) 1820, and a memory 1845. The configuration of FIG. 18 also includes a communication interface 1825. The communication interface 1825 may be wired or wireless and may in fact, include two interfaces-one for wired line communication and one for wireless communication. User interface and display 1810 is driven by interface circuit 1815. User interface 1810 and interface circuit 1815 are shaded in gray as these modules (component) may or may not both be present in the SNG. If they are not present in the SNG then they may be replaced by indicator lights instead of a display screen and keyboard like entry module (component).

The SNG includes at least one processor 1820 provides computation functions for the SNG, such as depicted in FIGS. 3, 5, 7, 10, 13 and 16. The processor 1820 can be any form of CPU or controller that utilizes communications between elements of the SNG to control communication and computation processes. Those of skill in the art recognize that bus 1850 provides a communications path between the various elements of embodiment 1800 and that other point-to-point interconnection options (e.g. non-bus architecture) are also feasible.

Any or all, of the functionality included in the SNG may be embodied as application specific integrated circuits (ASICs), field programmable gate arrays (FPGAs), reduced instruction set computers (RISCs) or any other equivalent separate type of co-processor integrated into processor 1820.

Memory 1845 can act as a repository for memory related to any of the methods that incorporate the functionality of the SNG. Memory 1845 can provide the repository for storage of information such as program memory, downloads, uploads, or scratchpad calculations. Those of skill in the art will recognize that memory 1845 may be incorporated all or in part of processor 1820. Communication interface 1825 has both receiver and transmitter elements for wired and/or wireless communications. Program instructions for operation of the processor of the SNG may be in memory 1845 or may be in processor 1820.

The processing in accordance with the method shown in FIGS. 3, 5, 7, 10, 13 and 16 is predominantly performed in the processor 1820 and the communications interface 1825. The processor performs the steps/acts of the method but the reception and transmission between the SNG 1800 and the TWBD and/or the SDMA and/or the SDMA is through the communications interface 1825.

Figure 19:
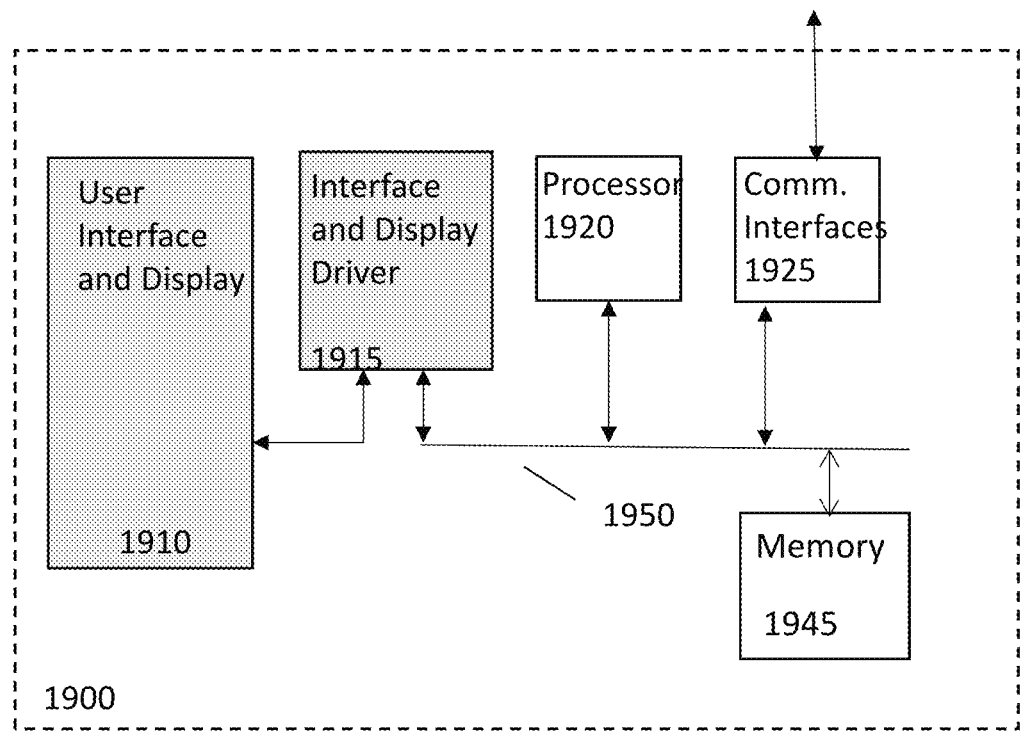
FIG. 19 is a block diagram of an exemplary embodiment of a TWBD for practicing the proposed method.

FIG. 19 is a block diagram of an exemplary embodiment of a TWBD for practicing the proposed method. The block diagram configuration includes a bus-oriented 1950 configuration interconnecting a processor (processing unit) 1920, and a memory 1945. The configuration of FIG. 19 also includes a communication interface 1925. The communication interface 1925 may be wired or wireless and may in fact, include two interfaces-one for wired line communication and one for wireless communication. User interface and display 1910 is driven by interface circuit 1915. User interface 1910 and interface circuit 1915 are shaded in gray as these modules (component) may or may not both be present in the TWBD. If they are not present in the TWBD then they may be replaced by indicator lights instead of a display screen and keyboard like entry module (component).

The TWBD includes at least one processor 1920 provides computation functions for the TWBD, such as depicted in FIGS. 3, 4, 7, 11, 13 and 17. The processor 1920 can be any form of CPU or controller that utilizes communications between elements of the TWBD to control communication and computation processes. Those of skill in the art recognize that bus 1950 provides a communications path between the various elements of embodiment 1900 and that other point-to-point interconnection options (e.g. non-bus architecture) are also feasible.

Any or all of the functionality included in the TWBD may be embodied as application specific integrated circuits (ASICs), field programmable gate arrays (FPGAs), reduced instruction set computers (RISCs) or any other equivalent separate type of co-processor integrated into processor 1920.

Memory 1945 can act as a repository for memory related to any of the methods that incorporate the functionality of the TWBD. Memory 1945 can provide the repository for storage of information such as program memory, downloads, uploads, or scratchpad calculations. Those of skill in the art will recognize that memory 1945 may be incorporated all or in part of processor 1920. Communication interface 1925 has both receiver and transmitter elements for wired and/or wireless communications. Program instructions for operation of the processor of the TWBD may be in memory 1945 or may be in processor 1920.

The processing in accordance with the method shown in FIGS. 3, 4, 7, 11, 13 and 17 is predominantly performed in the processor 1920 and the communications interface 1925. The processor performs the steps/acts of the method but the reception and transmission between the TWBD 1900 and the SNG and/or the SDMA and/or the SDMA is through the communications interface 1925.

Figure 20:
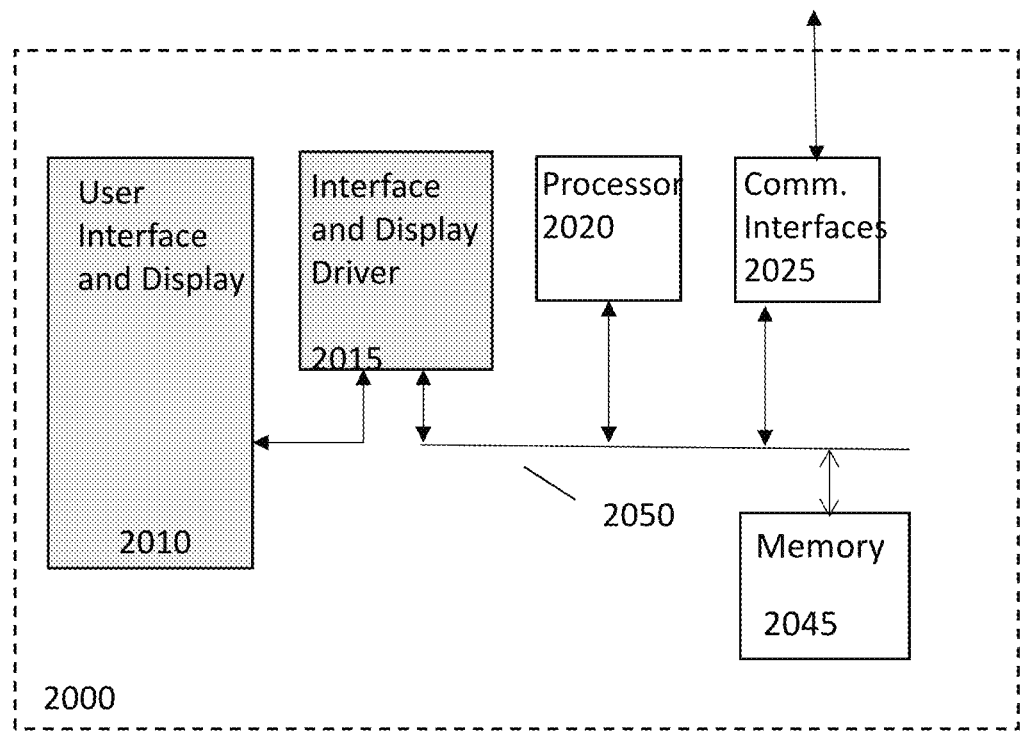
FIG. 20 is a block diagram of an exemplary embodiment of an SDMS for practicing the proposed method.

FIG. 20 is a block diagram of an exemplary embodiment of an SDMS for practicing the proposed method. The block diagram configuration includes a bus-oriented 2050 configuration interconnecting a processor (processing unit) 2020, and a memory 2045. The configuration of FIG. 20 also includes a communication interface 2025. The communication interface 2025 may be wired or wireless and may in fact, include two interfaces-one for wired line communication and one for wireless communication. User interface and display 2010 is driven by interface circuit 2015. User interface 2010 and interface circuit 2015 are shaded in gray as these modules (component) may or may not both be present in the SDMS. If they are not present in the SDMA then they may be replaced by indicator lights instead of a display screen and keyboard like entry module (component).

The SDMS includes at least one processor 2020 provides computation functions for the SDMS, such as depicted in FIGS. 7, 9, 13 and 15. The processor 2020 can be any form of CPU or controller that utilizes communications between elements of the SDMS to control communication and computation processes. Those of skill in the art recognize that bus 2050 provides a communications path between the various elements of embodiment 2000 and that other point-to-point interconnection options (e.g. non-bus architecture) are also feasible.

Any or all of the functionality included in the SDMS may be embodied as application specific integrated circuits (ASICs), field programmable gate arrays (FPGAs), reduced instruction set computers (RISCs) or any other equivalent separate type of co-processor integrated into processor 2020.

Memory 2045 can act as a repository for memory related to any of the methods that incorporate the functionality of the SDMS. Memory 2045 can provide the repository for storage of information such as program memory, downloads, uploads, or scratchpad calculations. Those of skill in the art will recognize that memory 2045 may be incorporated all or in part of processor 2020. Communication interface 2025 has both receiver and transmitter elements for wired and/or wireless communications. Program instructions for operation of the processor of the SDMS may be in memory 2045 or may be in processor 2020.

The processing in accordance with the method shown in FIGS. 7, 9, 13 and 15 is predominantly performed in the processor 2020 and the communications interface 2025. The processor performs the steps/acts of the method but the reception and transmission between the SDMS 2000 and the SNG and/or the SDMA and/or the TWBD is through the communications interface 2025.

Figure 21:
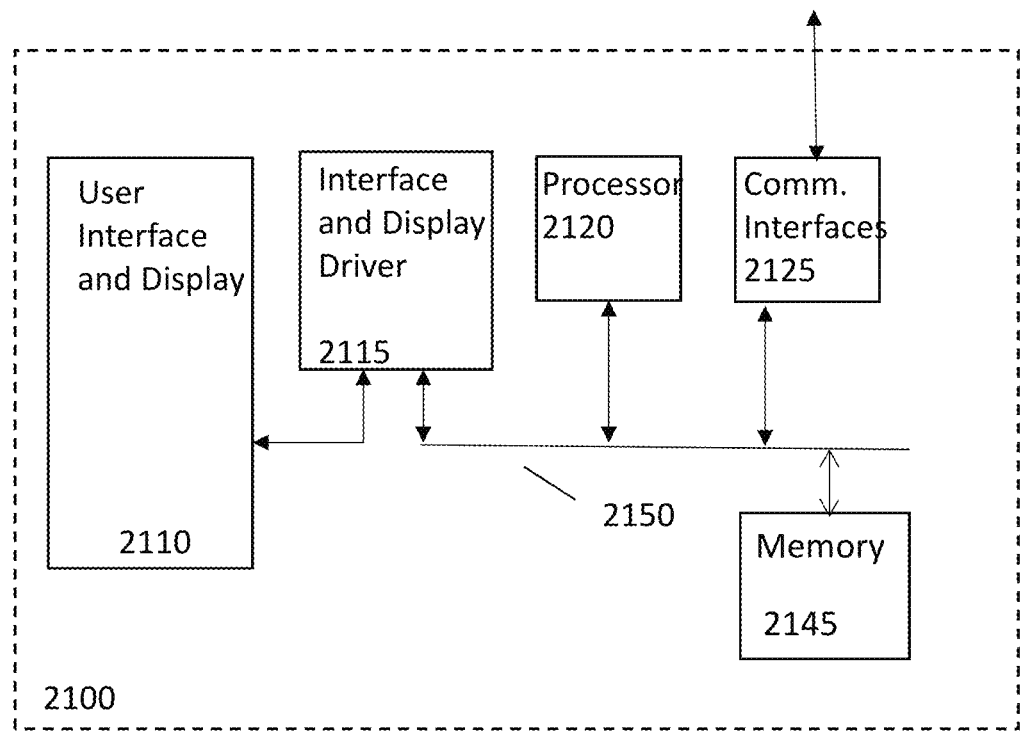
FIG. 21 is a block diagram of an exemplary embodiment of an SDMA for practicing the proposed method.

FIG. 21 is a block diagram of an exemplary embodiment of an SDMA for practicing the proposed method. The block diagram configuration includes a bus-oriented 2150 configuration interconnecting a processor (processing unit) 2120, and a memory 2145. The configuration of FIG. 21 also includes a communication interface 2125. The communication interface 2125 may be wired or wireless and may in fact, include two interfaces-one for wired line communication and one for wireless communication. User interface and display 2110 is driven by interface circuit 2115.

The SDMA includes at least one processor 2120 provides computation functions for the SDMA, such as depicted in FIGS. 7, 8, 13 and 14. The processor 2120 can be any form of CPU or controller that utilizes communications between elements of the SDMA to control communication and computation processes. Those of skill in the art recognize that bus 2150 provides a communications path between the various elements of embodiment 2100 and that other point-to-point interconnection options (e.g. non-bus architecture) are also feasible.

Any or all, of the functionality included in the SDMA may be embodied as application specific integrated circuits (ASICs), field programmable gate arrays (FPGAs), reduced instruction set computers (RISCs) or any other equivalent separate type of co-processor integrated into processor 2120.

Memory 2145 can act as a repository for memory related to any of the methods that incorporate the functionality of the SDMA. Memory 2145 can provide the repository for storage of information such as program memory, downloads, uploads, or scratchpad calculations. Those of skill in the art will recognize that memory 2145 may be incorporated all or in part of processor 2120. Communication interface 2125 has both receiver and transmitter elements for wired and/or wireless communications. Program instructions for operation of the processor of the SDMA may be in memory 2145 or may be in processor 2120.

The processing in accordance with the method shown in FIGS. 7, 8, 13 and 14 is predominantly performed in the processor 2120 and the communications interface 2125. The processor performs the steps/acts of the method but the reception and transmission between the SDMA 2000 and the SNG and/or the SDMS and/or the TWBD is through the communications interface 2125.

Once the SNG notices one of the registered TWBDs becomes unreachable, SNG should send a message to the SDMS to unregister this TWBD, and also destroy the HTTP proxy for this TWBD, and transmit (send, forward, issue) a warning message to the SDMA when receiving any request of this TWBD.

The proposed method and apparatus is detectable by the gateway (SNG), which can check all devices connected to the LAN to detect TWBD devices by probing the HTTP interfaces of the TWBD devices.

It is to be understood that the proposed method and apparatus may be implemented in various forms of hardware, software, firmware, special purpose processors, or a combination thereof. Special purpose processors may include application specific integrated circuits (ASICs), reduced instruction set computers (RISCs) and/or field programmable gate arrays (FPGAs). Preferably, the proposed method and apparatus is implemented as a combination of hardware and software. Moreover, the software is preferably implemented as an application program tangibly embodied on a program storage device. The application program may be uploaded to, and executed by, a machine comprising any suitable architecture. Preferably, the machine is implemented on a computer platform having hardware such as one or more central processing units (CPU), a random access memory (RAM), and input/output (I/O) interface(s). The computer platform also includes an operating system and microinstruction code. The various processes and functions described herein may either be part of the microinstruction code or part of the application program (or a combination thereof), which is executed via the operating system. In addition, various other peripheral devices may be connected to the computer platform such as an additional data storage device and a printing device.

It should be understood that the elements shown in the figures may be implemented in various forms of hardware, software or combinations thereof. Preferably, these elements are implemented in a combination of hardware and software on one or more appropriately programmed general-purpose devices, which may include a processor, memory and input/output interfaces. Herein, the phrase "coupled" is defined to mean directly connected to or indirectly connected with through one or more intermediate components. Such intermediate components may include both hardware and software based components.

It is to be further understood that, because some of the constituent system components and method steps depicted in the accompanying figures are preferably implemented in software, the actual connections between the system components (or the process steps) may differ depending upon the manner in which the proposed method and apparatus is programmed. Given the teachings herein, one of ordinary skill in the related art will be able to contemplate these and similar implementations or configurations of the proposed method and apparatus.

For purposes of this application and the claims, using the exemplary phrase "at least one of A, B and C," the phrase means "only A, or only B, or only C, or any combination of A, B and C."

What is claimed:

1. A method, at a gateway, comprising:
receiving, from a device, information related to the device and a request for a network address for the device, wherein the information includes an identifier of the device; and
upon determination that the device fulfils at least one criterion:
transmitting, to the device, the requested network address;
transmitting, to the device, using the requested network address, a request for a web content;
receiving, from the device, the requested web content; and
registering the device with a server device using information indicative of an Internet Protocol (IP) address of the gateway and the identifier of the device.

2. The method of claim 1, wherein the device related information comprises at least one of an identifier of a manufacturer of the device, a model number of the device and a serial number of the device.

3. The method of claim 1, further comprising:
after the transmitting, continuing the method only upon determination that the device is a smart device.

4. The method of claim 1, wherein the request for the web content is transmitted using a uniform resource locator comprising the requested network address.

5. The method of claim 1, wherein the requested network address is an IP address.

6. The method of claim 1, wherein the criterion is based on at least the information related to the device.

7. A gateway comprising at least one hardware processor configured to:
receive, from a device, information related to the device and a request for a network address for the device, wherein the information includes an identifier of the device; and
upon determination that the device fulfils at least one criterion:
transmit, to the device, the requested network address;
transmit, to the device, using the requested network address, a request for a web content;
receive, from the device, the requested web content; and
register the device with a server device using information indicative of an Internet Protocol (IP) address of the gateway and the identifier of the device.

8. The gateway of claim 7, wherein the device related information comprises at least one of an identifier of a manufacturer of the device, a model number of the device and a serial number of the device.

9. The gateway of claim 7, wherein the at least one processor is further configured to:
after the transmitting, continue the method only upon determination that the device is a smart device.

10. The gateway of claim 7, wherein the at least one processor is configured to transmit the request for the web content using a uniform resource locator comprising the requested network address.

11. The gateway of claim 7, wherein the requested network address is an IP address.

12. The gateway of claim 7, wherein the criterion is based on at least the information related to the device.

* * * * *